US006545659B2

(12) United States Patent
Kuramoto

(10) Patent No.: US 6,545,659 B2
(45) Date of Patent: Apr. 8, 2003

(54) METHOD OF ILLUMINATING A LIGHT VALVE WITH IMPROVED LIGHT THROUGHPUT AND COLOR BALANCE CORRECTION

(75) Inventor: Akinobu Kuramoto, Pleasanton, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 10/000,577

(22) Filed: Oct. 23, 2001

(65) Prior Publication Data

US 2002/0036615 A1 Mar. 28, 2002

Related U.S. Application Data

(63) Continuation of application No. 09/364,018, filed on Jul. 29, 1999, now Pat. No. 6,377,236.

(51) Int. Cl.[7] .................................................. G09G 5/00
(52) U.S. Cl. ...................................................... 345/102
(58) Field of Search ........................... 345/97, 102, 63, 345/77, 48, 84

(56) References Cited

U.S. PATENT DOCUMENTS 5,046,305 A * 9/1991 Skubic et al. ................. 53/572
6,252,636 B1 * 6/2001 Bartlett ........................ 348/743
6,329,974 B1 * 12/2001 Walker et al. ................ 345/98

* cited by examiner

Primary Examiner—Matthew C. Bella
Assistant Examiner—Mackly Monestime

(57) ABSTRACT

A method of illuminating a light valve using a light source with modulated intensity to improve light throughput and color balance while minimizing loss of color resolution. A light valve is provided that includes a light input, a light output and a spatial light modulator including an array of pixels. The spatial light modulator is illuminated through the light input with light generated by a light source having a nominal lamp power dissipation level. Image data is provided and the array of pixels is configured based on the image data during a display period so that the image data is represented in light from the light source received at the light output. During a portion of the display period, the intensity of the light generated by the light source is increased to a high level above the nominal lamp power dissipation. During another portion of the display period, the intensity of the light generated by the light source is decreased to a low level below the nominal lamp power dissipation level. The average lamp power dissipation level over the display period is maintained at a level that does not exceed the nominal lamp power dissipation level. The light valve provided may additionally include a color sequencer for sequentially selecting one of a first, a second, and a third colorband of light that may reach the light output. Alternatively, the light valve provided may include a first, a second, and a third spatial light modulator and a color separator for directing a first, a second, and a third colorband of light from light received at the light input to the first, the second, and the third spatial light modulator, respectively. The light valve provided may also include a first, second, and third shutter between the color separator and the first, second, and third spatial light modulator, respectively.

13 Claims, 20 Drawing Sheets

METHOD OF ILLUMINATING A LIGHT VALVE WITH IMPROVED LIGHT THROUGHPUT AND COLOR BALANCE CORRECTION

CROSS REFERENCE TO RELATED APPLICATION(S)

This is a continuation of application Ser. No. 09/364,018 filed on Jul. 29, 1999 now U.S. Pat. No. 6,377,236 which is hereby incorporated by reference herein.

FIELD OF THE INVENTION

The invention relates to methods for illuminating light valves such as those used in color video displays and in particular relates to methods of illuminating such light valves with improved throughput and adjustable color balance.

BACKGROUND OF THE INVENTION

A need exists for various types of video and graphics display devices with improved performance and lower cost. For example, a need exists for miniature video and graphics display devices that are small enough to be integrated into a helmet or a pair of glasses so that they can be worn by the user. Such wearable display devices would replace or supplement the conventional displays of computers and other devices. A need also exists for a replacement for the conventional cathode-ray tube used in many display devices including computer monitors, conventional and high-definition television receivers and large-screen displays. Both of these needs can be satisfied by display devices that incorporate a light valve that uses as its light control element a spatial light modulator. Spatial light modulators are typically based on liquid crystal material, but may also be based on arrays of moveable mirrors.

Liquid crystal-based spatial light modulators are available in either a transmissive form or in a reflective form. The transmissive spatial light modulator is composed of a layer of a liquid crystal material sandwiched between two transparent electrodes. The liquid crystal material can be either ferroelectric or nematic type. One of the electrodes is segmented into an array of pixel electrodes to define the picture elements (pixels) of the transmissive spatial light modulator. The direction of an electric field applied between each pixel electrode and the other electrode determines whether or not the corresponding pixel of the transmissive spatial light modulator rotates the direction of polarization of light falling on the pixel. The transmissive spatial light modulator is constructed as a half-wave plate and rotates the direction of polarization through 90° so that the polarized light transmitted by the pixels of the spatial light modulator either passes through a polarization analyzer or is absorbed by the polarization analyzer, depending on the direction of the electric field applied to each pixel.

Reflective liquid crystal-based spatial light modulators are similar in construction to transmissive liquid crystal-based spatial light modulators, but use reflective pixel electrodes and have the advantage that they do not require a transparent substrate. Accordingly, reflective spatial light modulators can be built on a silicon substrate that also accommodates the drive circuits that derive the drive signals for the pixel electrodes from the input video signal. A reflective light valve has the advantage that its pixel electrode drive circuits do not partially occlude the light modulated by the pixel. This enables a reflective light valve to have a greater light throughput than a similar-sized transmissive light valve and allows larger and more sophisticated drive circuits to be incorporated.

As with the transmissive spatial light modulators, the direction of an electric field (in this case between the transparent electrode and the reflective electrode) determined whether or not the corresponding pixel of the reflective spatial light modulator rotates through 90° the direction of polarization of the light falling on (and reflected by) by the pixel. Thus, the polarized light reflected by the pixels of the reflective spatial light modulator either passes through a polarization analyzer or is absorbed by the polarization analyzer, depending on the direction of the electric field applied to each pixel.

The resulting optical characteristics of each pixel of both the transmissive and reflective spatial light modulators are binary: each pixel either transmits light (its 1 state) or absorbs light (its 0 state), and therefore appears light or dark, depending on the direction of the electric field.

To produce the grayscale required for conventional display devices, the apparent brightness of each pixel is varied by temporally modulating the light transmitted/reflected by each pixel. The light is modulated by defining a basic time period that will be called the illumination period of the spatial light modulator. The pixel electrode is driven by a drive signal that switches the pixel from its 1 state to its 0 state. The duration of the 1 state relative to the duration of the illumination period determines the apparent brightness of the pixel.

Ferroelectric liquid crystal-based spatial light modulators suffer the disadvantage that, after each time the drive signal has been applied to a pixel electrode to cause the pixel to modulate the light either transmitted/reflected by it, the DC balance of the pixel must be restored. This is typically done by defining a second basic time period called the balance period, equal in duration to the illumination period, and driving the pixel electrode with a complementary drive signal (reverse representation) having 1 state and 0 state durations that are complementary to the 1 state and 0 state durations of the drive signal (positive representation) during the illumination period. The illumination period and the balance period collectively constitute a display period.

To prevent the complementary drive signal from causing the display device to display a substantially uniform, grey image, the light source illuminating the light valve is modulated, either directly or with a shutter, so that the light valve is only illuminated during the illumination period, and is not illuminated during the balance period, as depicted in FIG. 1. However, modulating the light source as just described reduces the light throughput of the light valve to about half of that which could be achieved if DC balance restoration were unnecessary. This means that a light source of approximately twice the intensity, with a corresponding increase in cost, is necessary to achieve a given display brightness for ferroelectric liquid crystal-based spatial light modulators. Additionally or alternatively, projection optics with a greater aperture, also with a corresponding increase in cost, are necessary to achieve a given brightness.

To produce color output required for conventional display devices, a single spatial light modulator may be used or multiple spatial light modulators may be used. In order to produce a color output from a single spatial light modulator, the spatial light modulator is illuminated sequentially with light of different colors, typically red, blue, and green. This sequential illumination may be accomplished using multiple light sources, each having one of the desired illumination colors, or by using a "white" light source with sequential color filtering. For purposes of this description a "white" light source is one that emits light over a broad portion of the visible light spectrum. In either case, each of the sequential colors is modulated individually by the spatial light modulator to produce three sequential single-color images. If the sequence of single-color images occur quickly enough, a viewer of the sequential single-color images will be unable to distinguish the sequential single-color images from a full-color image.

When the single spatial light modulator used to produce color output is a ferroelectric liquid crystal-based spatial light modulator, DC balance must be restored, as previously discussed. Typically, DC balance is restored after each of the sequential colored illuminations as depicted in FIG. 2. Modulating the light source in this manner reduces the light throughput of the light valve to about half of that which could be achieved if DC balance restoration were unnecessary.

To produce color output using multiple spatial light modulators, each of the spatial light modulators is simultaneously illuminated with a different colored light. This can be accomplished using multiple light sources, each having one of the desired illumination colors, or by using a "white" light source with a color separator. Typically three spatial light modulators are used, one illuminated with red light, one with blue light, and one with green light. Each of the spatial light modulators modulates the colored light that illuminates it to form a single-colored image, and the single-colored images from each of the spatial light modulators are combined into a single full-color image.

When the three spatial light modulators used to produce color output are ferroelectric liquid crystal-based spatial light modulators, DC balance of each of the spatial light modulators must be restored. Typically, DC balance is restored simultaneously to each of the spatial light modulators (S.L.M.s) after a simultaneous illumination period, as depicted in FIG. 3. Modulating the light source in this manner, once again, reduces the light throughput of the light valve to about half of that which could be achieved if DC balance restoration were unnecessary.

FIG. 4A shows part of a display device incorporating a conventional transmissive light valve 2 including a single transmissive liquid crystal based spatial light modulator 4. Other principal components of the display device are the polarizer 6, the analyzer 8, and the color sequencer 9. The light valve is illuminated with light from the "white" light source 10, the efficiency of which may be improved using a reflector 12 and collector optics 14 that concentrate the light towards the polarizer 6. The light output by the light valve passes to the output optics 16 that focus the light to form an image (not shown). The light valve, light source (including reflector and collector optics) and output optics may be incorporated into various types of display device, including miniature, wearable devices, cathode-ray tube replacements, and projection displays.

Light generated by the light source 10 passes through the polarizer 6. The polarizer polarizes the light output from the light source. The polarized light is then transmitted to the color sequencer 9. The color sequencer, allows only a portion of the light in a particular color waveband to pass, filtering the remaining wavelengths of light.

FIG. 4B is a front view of the particular type of color sequencer shown in FIG. 4A. This type of color sequencer 9 is a wheel 18 that can spin around a pivot 20 driven by a stepper motor 22. The wheel includes several filter windows 24 that allow only a particular waveband of light to pass, blocking the remaining light. Blue, Green and Red filer windows are depicted that allow only a blue, a green, or a red waveband of light, respectively, to pass. A color sequence controller 26 is connected to the stepper motor. The controller 26 directs the stepper motor to rotate the wheel around the pivot in the direction indicated by arrow 28, to stop the wheel when the next window 24 is aligned with the spatial light modulator 4, and to begin rotation again after a given period of time has elapsed. Thus, the spatial light modulator is illuminated sequentially with polarized light that is in a blue waveband, a green waveband, and a red waveband.

The spatial light modulator 4 is divided into a two-dimensional array of picture elements (pixels) 30 that define the spatial resolution of the light valve. The direction of an electric field in each pixel of the spatial light modulator 12 determines whether or not the direction of polarization of the light reflected by the pixel is rotated by 90° relative to the direction of polarization of the incident light. A substantially reduced number of pixels 30 are shown to simplify the drawing. For example, in a light valve for use in a large-screen computer monitor, the reflective electrode could be divided into a two-dimensional array of 1600×1200 pixel electrodes.

Referring back to FIG. 4A, the light transmitted by each pixel 30 of the spatial light modulator passes to the analyzer 8 and is output from the light valve 2 depending on whether or not its direction of polarization was rotated by the spatial light modulator. The light output from the light valve 2 passes to the output optics 16 to form an image (not shown). This image will consist of green pixels if the color sequencer 9 is in the position shown in FIG. 4B. The following two images output by the light valve 2 will consist of blue pixels and red pixels, respectively. If these images occur quickly enough in sequence, a viewer will see what appears to be a full color image.

FIG. 5 depicts part of a prior art display device incorporating a conventional reflective light valve 39 including a single reflective spatial light modulator 40. It is noted that throughout the following description, elements that are identical to elements previously described are indicated by like reference numerals and will not be described again. The reflective light valve 39 operates in essentially the same manner as the transmissive light valve 2, except that the light transmitted by the color sequencer 9 is reflected by the spatial light modulator 40 rather than being transmitted through it. The reflective spatial light modulator 40 is similar to the previously described transmissive spatial light modulator 4 inasmuch as it is divided into a two-dimensional array of picture elements (pixels) 30 that define the spatial resolution of the light valve 39. In addition, the direction of an electric field in each pixel of the reflective spatial light modulator 40 determines whether or not the direction of polarization of the light reflected by the spatial light modulator 40 at that pixel is rotated by 90° relative to the direction of polarization of the incident light.

In the configuration depicted in FIG. 2, the reflective light valve 39 is configured with the light from the light source 10 illuminating the reflective spatial light modulator 40 at an incident angle $\phi$ from the perpendicular. The light reflected from the spatial light modulator is also reflected at an angle $\phi$ from the perpendicular in a direction opposite that of the incident light. Thus, the angle between the light illuminating the spatial light modulator and the light reflected from the spatial light modulator is equal to $2\phi$. This angle allows the light reflected from the spatial light modulator 40 to transmit unobstructed to the analyzer 8 and allows for a compact overall design.

FIG. 6 depicts part of another prior art display device that, like the device shown in FIG. 5, incorporates a conventional reflective light valve 39 including a single reflective spatial light modulator 40. This display device is distinct from those previously described inasmuch as it utilizes a beam splitter 44. The beam splitter reflects the light from the light source 10 towards the reflective spatial light modulator 40 after it has been polarized by polarizer 6. At the same time, the beam splitter functions to transmit the light reflected from the reflective spatial light modulator towards the analyzer 8. Alternatively, the components could be rearranged (not shown) so that the beam splitter transmits light from the light source towards the reflective spatial light modulator while reflecting the light reflected from the spatial light modulator towards the analyzer.

Using a beam splitter in the manner described offers the advantage that the spatial light modulator 40 can be illuminated from, and reflect light along a path perpendicular to the spatial light modulator. This eliminates any distortion that may result from illuminating the reflective spatial light modulator from an angle φ as shown in FIG. 5.

FIGS. 7–9 each depict part of a prior art display device incorporating a conventional triple reflective light valve 46 that includes three reflective liquid crystal-based spatial light modulators 40. Each of the triple reflective light valves depicted operates in a similar manner to the display devices previously described. First, the light valve 46 is illuminated with light from the "white" light source 10, the efficiency of which may be improved using a reflector 12 and collector optics 14 that concentrate the light towards the polarizer 6. The polarized light is then reflected by the beam splitter 44 towards a color separator.

In FIG. 7, the color separator is a series of three dichroic plates 48, 50, and 52, each having an associated reflective spatial light modulator 40. Each of the dichroic plates is configured to reflect light in a band of wavelengths (colorband) particular to that dichroic plate and to pass the remaining wavelengths of light. Thus, a particular portion of the color spectrum from the light generated by the "white" light source 10 may be reflected by each dichroic plate towards its associated reflective spatial light modulator 40 simultaneously. This eliminates the need for the previously described sequential illumination, and improves the perceived brightness of the color pixels passing through the analyzer 8.

For example, the dichroic plate 48 nearest the beam splitter 44 might reflect red-colored light toward its associated spatial light modulator 40 while the center dichroic plate 50 reflects green-colored light toward its associated spatial light modulator and the remote dichroic plate 52 farthest from the beam splitter reflects blue-colored light towards its spatial light modulator. When the light source 10 is ON, as shown, the colored light reflected by the dichroic plates passes to each of the three reflective spatial light modulators 40. Each of the three reflective spatial light modulators is capable of reflecting pixels of the colored light back at its associated dichroic plate in a manner consistent with the above description of the operation of the reflective spatial light modulator.

The pixellated light reflected by each of the spatial light modulators 40 will consist entirely of wavelengths in the colorband first reflected by the associated dichroic plate. Thus, the vast majority of the pixellated light reflected by each spatial light modulator 40 will be reflected by its associated dichroic plate 48, 50, 52 back toward the beam splitter 44. The beam splitter transmits this pixellated light towards the analyzer 8 and is output from the light valve 46 depending on whether or not its direction of polarization was rotated by the spatial light modulator. The light output from the light valve 46 passes to the output optics 16 to form an image (not shown). This image will be a color image consisting of a combination of the red, blue and green colored pixels from all three spatial light modulators that pass through the analyzer.

In FIG. 8 the color separator is a color separation cube 54, sometimes known as an x-cube or crossed-dichroic cube. As with the three dichroic plates depicted in FIG. 7, the color separation cube separates three distinct colorbands from the "white" light created by light source 10 and directs each of the colorbands to a particular spatial light modulator 40. The color separation cube 54 also recombines the light reflected from each of the spatial light modulators 40 and directs the combined light toward the analyzer beam splitter 44. The use of a color separation cube allows for a more compact design utilizing three spatial light modulators than can be achieved using three separate dichroic plates 48, 50, 52.

In FIG. 9, the color separator is a three-prism color separator 56 (sometimes known as a Philips cube or Philips prism). The design and use of a three-prism color separator is described in detail in U.S. Pat. No. 5,644,432, the contents of which are incorporated herein by reference. Like the previously described color separators, the three-prism color separator separates three distinct colorbands from the "white" light created by light source 10 and directs each of the colorbands to a particular spatial light modulator 40. The three-prism color separator 56 also recombines the light reflected from each of the spatial light modulators 40 and directs the combined light toward the beam splitter 44. The three-prism color separator has the advantage over the three dichroic plates 48, 50, 52 and the color separation cube 54 since it typically does a better job of recombining the reflected light from each of the spatial light modulators into a single color image, the color separator consists of three dichroic plates 42, 43, and 44.

In each of the previously described light valves, maintaining an appropriate balance between each of the three color (red, blue and green) pixellated images is critical to the accurate reproduction of colors in the displayed image. The task of maintaining an appropriate color balance can be a difficult problem since many "white" light sources are inherently unbalanced and the characteristics of the light they produce can change over time. For example, some types of arc-lamp produce far more green light than they do red or blue light at a given "white" light intensity level. The relative level of green, blue and red light generated by a "white" light source can also change with operating conditions including items such as operating temperature, operating voltage, age of the light source, contamination, etc.

One technique which has been used to compensate for the unbalanced "white" light source, is to attenuate the modulation of the spatial light modulator illuminated with the highest intensity color. Thus, in a single spatial light modulator system with high intensity green light relative to the blue and red, the spatial light modulator attenuates the modulation of the green light. This is done by temporally modulating the light transmitted/reflected by each pixel such that the duration of the 0 state relative to the duration of the illumination period is extended to reduce the apparent brightness of the pixel. A similar technique can be used with the green illuminated spatial light modulator in a three spatial light modulator system.

Reducing the intensity of the higher intensity colored light at the light output by attenuating the spatial light modulator has the disadvantage that it reduces the throughput of the light valve and reduces the color resolution of the light valve. For example, if the intensity of the green component of the "white" light is twice that of the red and blue components, and a spatial light modulator is normally capable of producing 256 grayscale levels during an illumination period, 128 grayscale levels will be used to attenuate the green light. This will effectively reduce to 128 the number of grayscale levels that can be used to display the image.

Consequently, what is needed a method of illuminating a light valve that provides improved light throughput and color balance while maintaining the color resolution capability of the light valve.

SUMMARY OF THE INVENTION

The invention provides a method of illuminating a light valve using a light source with modulated intensity to improve light throughput and color balance while minimizing loss of color resolution. The method begins by providing a light valve that includes a light input, a light output and a spatial light modulator. The spatial light modulator includes an array of pixels, each pixel in the array capable of modulating light traveling along an optical path that intersects the pixel between the light input and the light output. Next, the spatial light modulator is illuminated through the light input with light generated by a light source having a nominal lamp power dissipation level. Image data is then provided and the array of pixels is configured based on the image data during a display period so that the image data is represented in light from the light source received at the light output. During a portion of the display period, the intensity of the light generated by the light source is increased to a high level above the nominal lamp power dissipation. During another portion of the display period, the intensity of the light generated by the light source is decreased to a low level below the nominal lamp power dissipation level. The average lamp power dissipation level over the display period is maintained at a level that does not exceed the nominal lamp power dissipation level. Finally, new image data is provided and the process from that point forward repeats.

The spatial light modulator provided may be a ferroelectric liquid-crystal based spatial light modulator, in which case, configuring the array of pixels includes representing the image data in the light from the light source as a positive representation during an illumination portion of the display period and as a reverse representation during a balance portion of the display period. In addition, increasing the intensity of the light occurs during the illumination portion, and decreasing the intensity of the light occurs during the balance portion and may include completely turning off the light source. Further, a brightness user interface may be provided which allows selection of a desired brightness level, and the high level may be set based on the desired brightness level selected.

The light valve provided by the method according to the invention may additionally include a color sequencer for sequentially selecting one of a first, a second, and a third colorband of light that may reach the light output. When the color sequencer is set to the first colorband of light, first colorband image data is provided. The array of pixels is then configured based on the first colorband image data during a first colorband period so that the first colorband image data is represented in the first colorband light received at the light output. Similarly, while the color sequencer is set to the second and then the third colorband of light, second and then third colorband image data is provided, respectively. The array of pixels is configured during a second and third colorband period, respectively, so the second and then the third colorband image data is represented in the second and third colorband light received at the light output, respectively.

During each of the first, second, and third colorband periods, the light generated by the light source is modulated, but the average lamp power dissipation level over the first, second, and third colorband periods is maintained at a level that does not exceed the nominal lamp power dissipation level. Modulating the light source may include turning off the light source during a portion of the first, second, and third colorband period when the spatial light modulator provided is a ferroelectric liquid crystal-based spatial light modulator. Additionally, modulating the light source may include setting the intensity of the light to a first, second, and third level during the first, second, and third colorband period, respectively. The first, second, and third levels may be set to balance to first, second, and third colorband of light at the light output. The first, second, and third levels may be set based on a measured intensity of each of the first, second and third colorband of light. Alternatively, the first, second, and third levels may be set based on desired color balance selected on a color balance user interface.

The light valve provided by the method according to the invention may alternatively include a first, a second, and a third spatial light modulator, each with a first, a second, and a third array of pixels, respectively. Each pixel in each of the first, the second and the third array of pixels is capable of modulating light traveling along an optical path that intersects the pixel between the light input and the light output. In addition the light valve with three spatial light modulators includes a color separator for directing a first, a second, and a third colorband of light from light received at the light input to the first, the second, and the third spatial light modulator, respectively. The light valve may also include a first, second, and third shutter between the color separator and the first, second, and third spatial light modulator, respectively.

The first, the second, and the third array of pixels may be configured to encode a first, a second, and a third representation of the first, the second, and the third colorband image data in the first, the second, and the third colorband of light, respectively, during a display period. The intensity of the light generated by the light source is modulated during the display period while an average lamp power dissipation level that does not exceed the nominal lamp power dissipation level over the display period is maintained. The modulation of the intensity of the light generated by the light source may be used to control a color balance of the first, the second, and the third colorband of light received at the light output. In addition, both the timing of the modulation of the light source and the level of intensity modulation may be adjusted to control color balance.

Each of the provided first, the second, and the third spatial light modulators may be ferroelectric liquid-crystal based spatial light modulators. In such a case, each of the spatial light modulators is independently configured so that the first, the second, and the third array of pixels encode a positive representation of the first, the second, and the third colorband image data, respectively, for approximately half of the display period and encode a reverse representation of the first, the second, and the third colorband image data, respectively, for substantially the remainder of the display period. The positive representations may by configured in all three spatial light modulators simultaneously, one of the spatial light modulators may display the positive representation while the other two display a reverse representation, or all start of the positive representations may be configured in a staggered manner. The first, second, and third shutters are used to prevent the first, second, and third colorband of light from reaching the first, second, and third array of pixels, respectively, when they are configured to encode reverse representations.

Accordingly, the method of illuminating a light valve according to the invention provides improved light throughput and color correction. Other features and advantages of the present invention will become apparent from the following detailed description, taken in conjunction with the accompanying drawings, illustrating, by way of example, the principles of the invention.

DETAILED DESCRIPTION OF THE INVENTION

Figure 1:
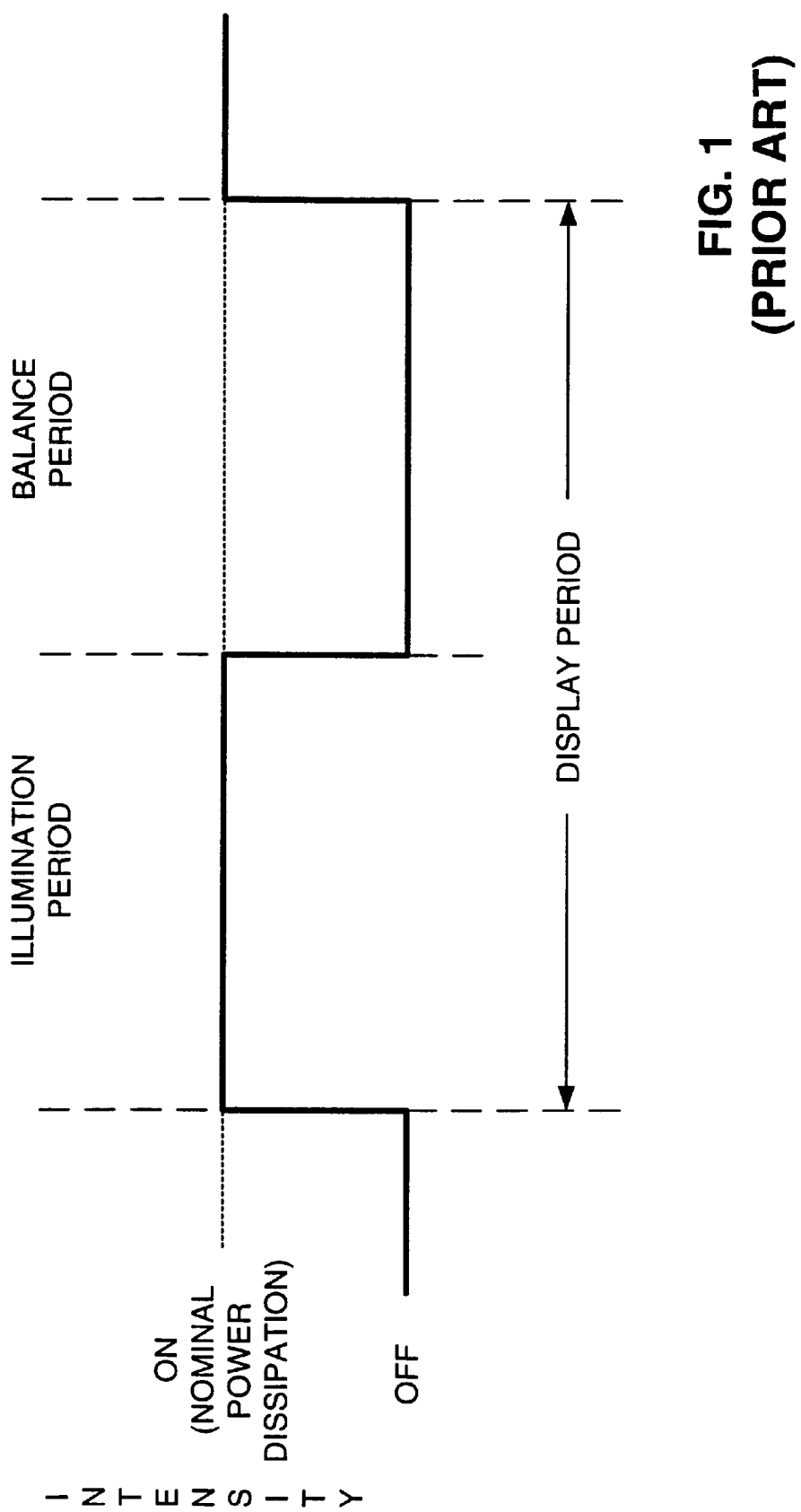
FIG. 1 illustrates the modulation of a light source in a conventional ferroelectric liquid crystal-based light valve.
Figure 2:
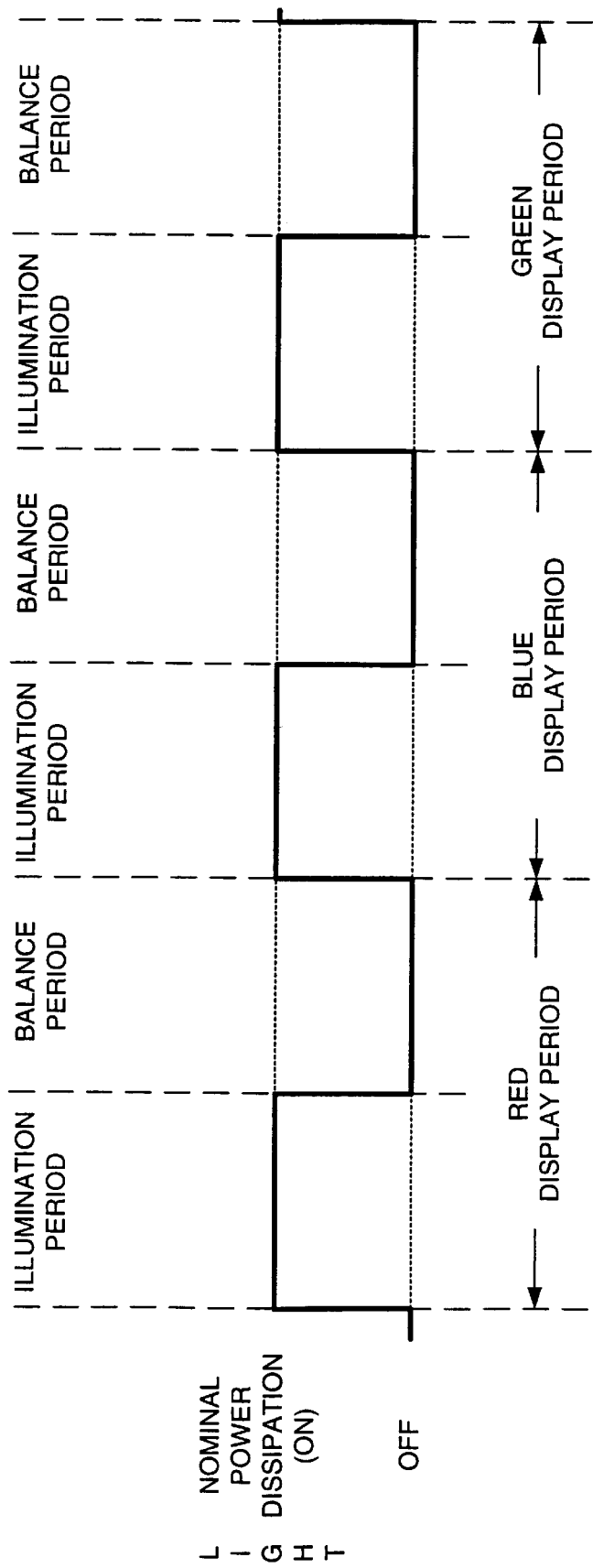
FIG. 2 illustrates the modulation of a light source in a conventional ferroelectric liquid crystal-based light valve with sequential color illumination such as those shown in FIGS. 4A–6.
Figure 3:
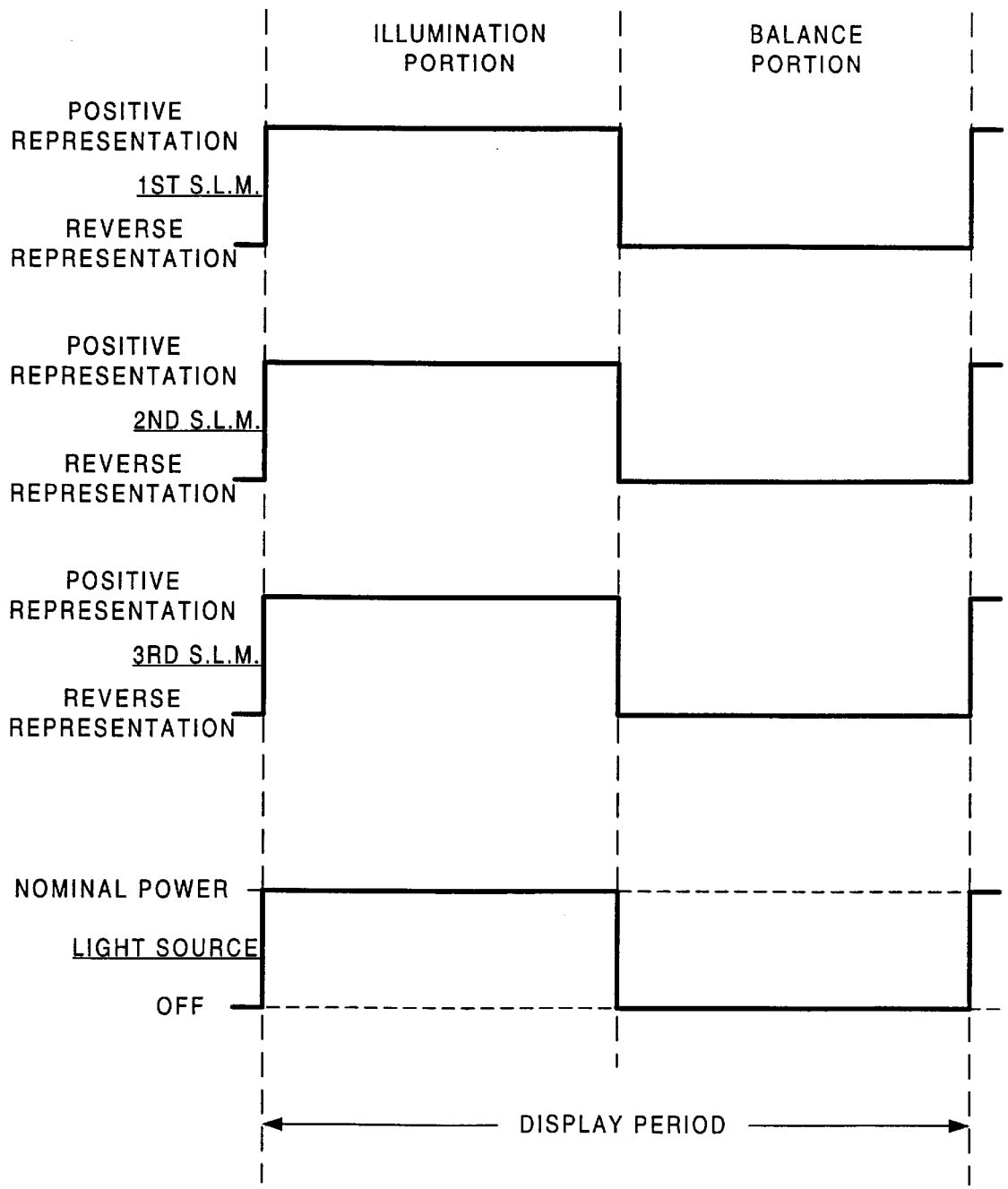
FIG. 3 illustrates the modulation of a light source in a conventional ferroelectric liquid crystal-based light valve with three spatial light modulators such as those shown in FIGS. 7–9.

The invention is based, in part, on the concept that a light source can be made to operate at an intensity in excess of its nominal power dissipation level for brief periods, so long as the average power dissipation level remains at or below the nominal power dissipation level over relatively short durations. By increasing the intensity of the illumination above the nominal power dissipation level when it can most effectively be utilized, and balancing this by reducing the intensity of the illumination when it can't be effectively used, the light throughput of a light valve can be improved. In addition, color balance can be accurately controlled using variations of this technique.

As will be discussed below, light valves including all types of spatial light modulators will benefit from improved throughput and color balance using the method of illuminating the light valve according to the invention. Light valves including ferroelectric liquid crystal-based spatial light modulators however, may be most benefitted by the method of illuminating the light valve according to the invention due to their illumination period/balance period operation.

In its most basic form, the method for illuminating a light valve according to the invention provides for the illumination of a simple light valve that includes a single a spatial light modulator. The first step of the method is providing the light valve. The light valve may be similar to the transmissive sequential color light valve 2 depicted in FIG. 4A or it may be similar to the reflective sequential color light valves 39 depicted in FIG. 5 or 6. Alternatively, the light valve may be a monochromatic light valve, in which case it may have a similar structure to the sequential color light valves 2, 39, but without the color sequencer 9. The light valve provided should include a light input 103, a light output 105, and a transmissive or reflective spatial light modulator 4, 40 having an array of pixels 30 with each pixel capable of modulating light traveling along an optical path 19 that intersects the pixel between the light input and the light output. While the spatial light modulator depicted is a ferroelectric liquid crystal-based spatial light modulator, other types of liquid crystal-based and non liquid crystal-based spatial light modulators may be substituted.

The transmissive or reflective spatial light modulator 4, 40 is then illuminated through the light input 103 with light generated by a light source 10. The light source is preferably a "white" light source emitting light over a broad portion of the visible light spectrum. "White" light sources include incandescent, flourescent, and arc type light sources. The light source should have a nominal power dissipation level at which it can operate continuously over a long period of time without damage. It is also preferable that the light source be able to illuminate at a number of intensity levels between an "off" state and a "bright" state above the nominal power dissipation level. In addition, the light source should have a rapid response time between the modulation of the light source control input (typically voltage or current levels) and the corresponding modulation of the intensity of the light generated by the light source.

Next, image data (not shown) is provided to the spatial light modulator. Image data is typically taken from digital or analog video signals and when used to drive a spatial light modulator is usually is either monochromatic (for example, providing a black & white, "grayscale" image) or a color component (usually blue, green or red) of a full color image. Typically, new image data will be provided at a "frame rate" of about 24 to 30 times per second. With color sequential light valves like those shown in FIGS. 4A, 5 and 6, however, the rate at which the individual color component data is sequentially provided is three times higher so all three color images may be shown sequentially while maintaining the full color "frame rate" of 24 to 30 full color images per second.

The array of pixels 30 of the spatial light modulator 4, 40 is then configured based on the image data provided so that the image data is represented in light from the light source 10 received at the light output 105. The period of time during which the spatial light modulator is configured based on the image data before it reconfigures for new image data is called the "display period." Configuring the array of pixels may be a "static" process in some types of spatial light modulators which use an "analog" modulation scheme. In the analog modulation scheme each pixel is set to a condition that allows some fraction of the light received by that pixel 30 from the light input 103 to reach the light output 105. In these types of spatial light modulators the array of pixels is not reset to a new condition until new image data is received.

Most spatial light modulators, including liquid crystal-based spatial light modulators, however, use a "digital" modulation scheme. In the digital modulation scheme each pixel can be set to either a 1 state, in which light received by the pixel 30 from the light input 103 reaches the light output 105, or a 0 state, in which light received by the pixel from the input does not reach the light output. Each pixel is "dynamically" configured to temporally modulate between a 1 state and a 0 state to in order to allow some fraction of the light received by the pixel from the light input to reach the light output.

In addition, when the spatial light modulator is ferroelectric liquid crystal-based, the step of configuring the pixels during a display period includes restoring the DC balance of the spatial light modulator. This is usually done by temporally modulating the pixel between the 1 state and the 0 state based on the image data for half the display period (illumination portion), and then reversing the ratio of the 1 state to the 0 state for a second half of the display period (balance portion). As a result, a positive representation of the image data is formed in light from the light source 10 received at the light output 105 during the illumination period, and a reverse representation of the image data is formed during the balance portion. This would result in a uniformly gray image at the light output if the illumination from the light source 10 was not modulated.

Figure 10:
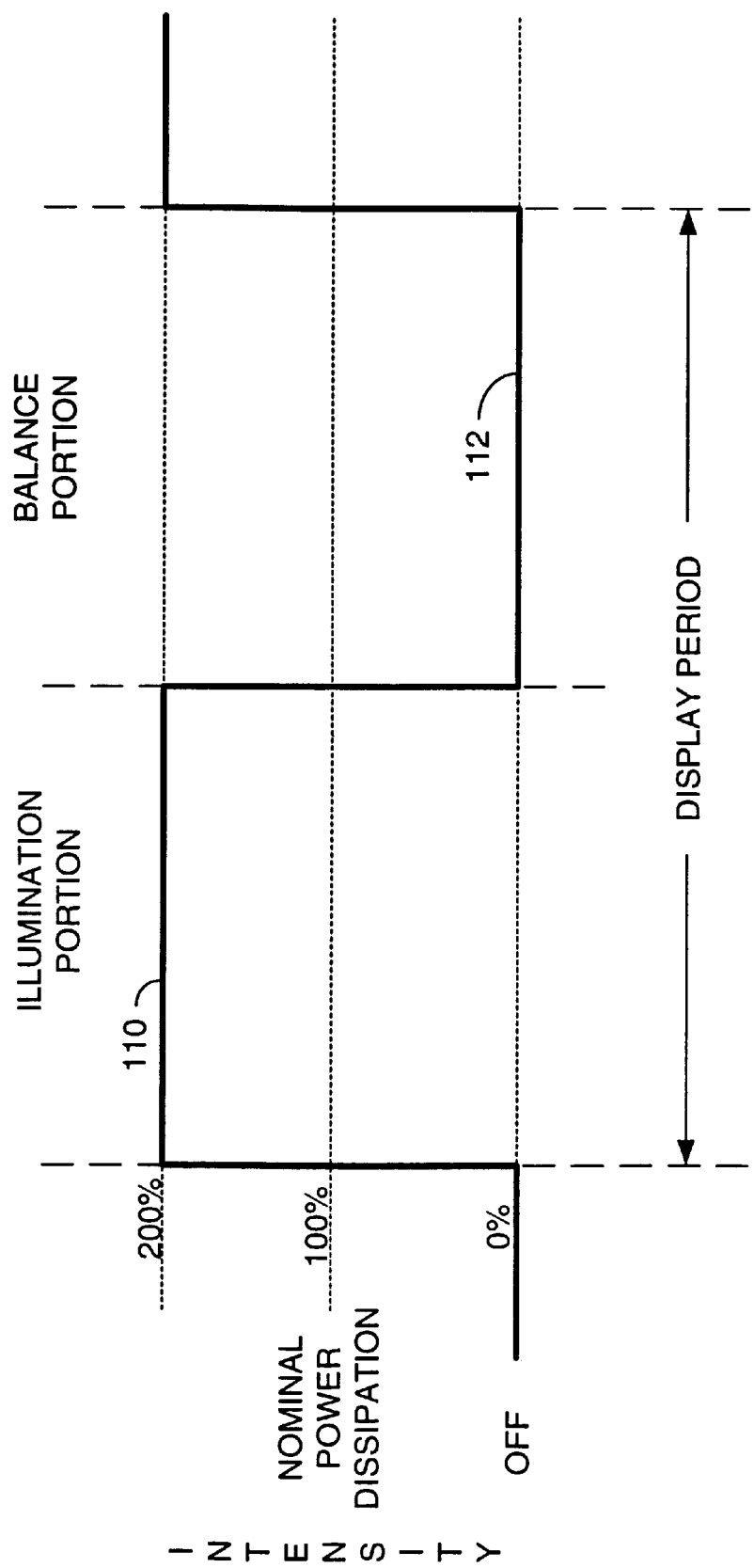
FIG. 10 illustrates the illumination of a light valve with a ferroelectric liquid crystal-based spatial light modulator to improve light throughput according to the invention.

Referring now to FIG. 10, the intensity of the light generated by the light source 10 during the display period is depicted. As shown, the intensity of the light is increased to a high level 110 above the nominal lamp power dissipation level for a portion of the display period and is also decreased to a low level 112 below the nominal power dissipation level for another portion of the display period. While the increase in intensity level to high level 110 occurs before the decrease in intensity level to low level 112 in FIG. 10, the order is not important and may be reversed. Further, while only a single longer high level 110 and a single longer low level 112 as shown in the display period, these could easily be replaced by numerous shorter high level 110 and low level 112 periods could take place during the display period.

In FIG. 10, the high and low levels are shown for a light valve that includes a ferroelectric liquid crystal-based spatial light modulator. Thus, the portion of the display period during which the intensity is increased to high level 110 substantially corresponds to the illumination portion of the display period. In addition, the portion of the display period during which the intensity is decreased to low level 112 substantially corresponds to the balance portion of the display period. Also, the high level 110 has a magnitude of approximately 200% of the nominal power dissipation level, and the low level 112 corresponds to an "off" condition of the light source.

Figure 11:
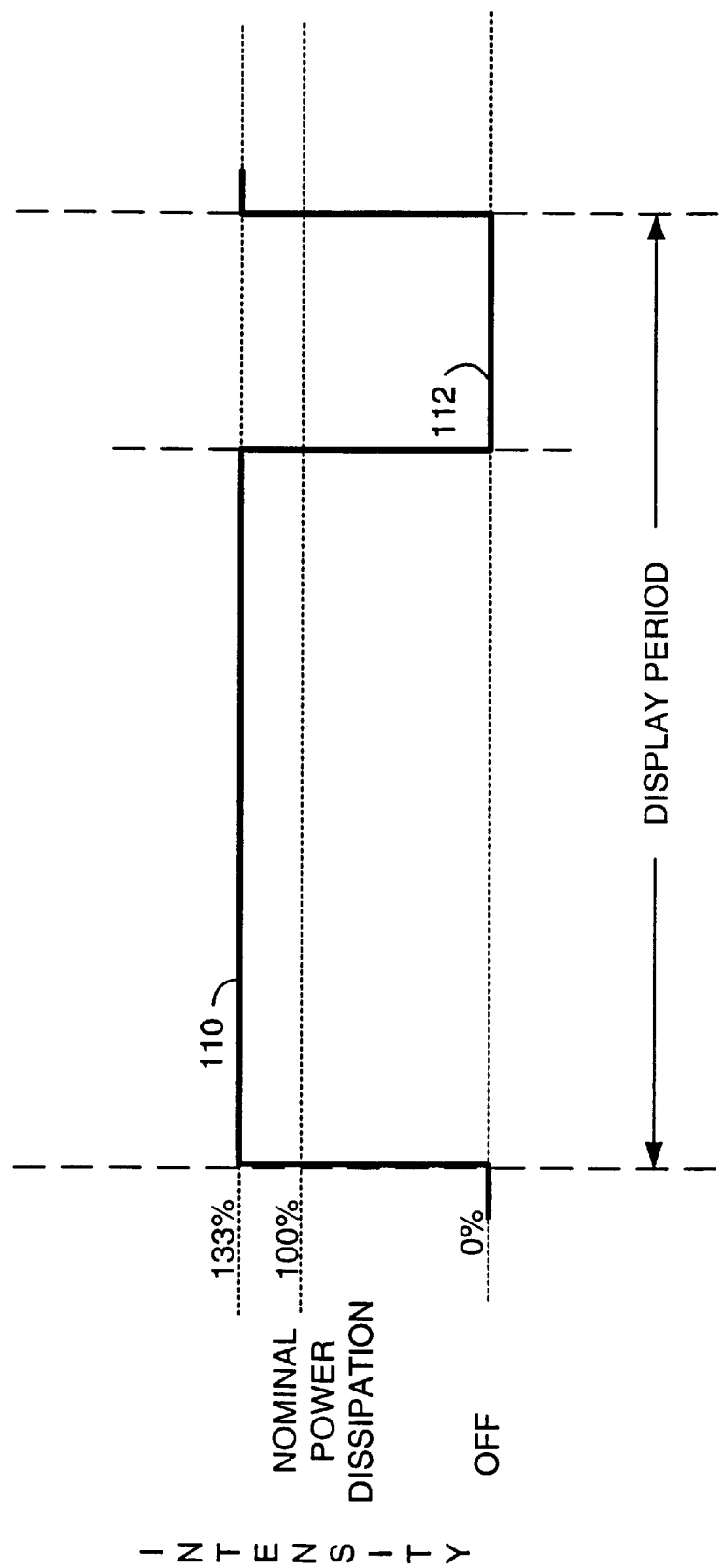
FIG. 11 illustrates the illumination of a light valve with a different spatial light modulator to improve light throughput according to the invention.

The method of illumination according to the invention may be used with light valves including other types of spatial light modulators as well. In such a case, the relative duration of the high level 110 to the low level 112 during the display period, and the magnitude of high level 110 and low level 112 would be altered to provide the best light throughput for the characteristics of the spatial light modulator involved. For example, FIG. 11 illustrates the modulation of the intensity of light generated by a light source for a light valve including a spatial light modulator requiring a quarter of a display period to change configurations from the image data to new image data. Since it would be undesirable to illuminate such a light valve while it is changing configurations, light throughput may be improved using a method according to the invention. In this case the intensity of the light source is increased to a high level 110 for three-quarters of the display period and is decreased to a low level 112 for a duration corresponding to the configuration time for the spatial light modulator. Presuming the light source would be turned off when the intensity was decreased to the low level, the high level could be increased to a magnitude of approximately 133% of the nominal power dissipation level.

As an alternative to maximizing the light throughput of the light valve, the method according to the invention may also be used to give brightness control to the user of the display in which the light valve is located. This can be accomplished by providing a brightness user interface which allows the user to select a desired brightness level. The brightness user interface may be any type of such user interfaces known in the art including a brightness knob, digital on-screen control, or up/down pushbutton type controls. The user's inputs received at the brightness user interface are then used to set the high level 110 and/or the low level 112 at levels that provide the user with the desired brightness level.

No matter what type of spatial light modulator is used by the light valve, or whether the light throughput is being maximized or set to a user specified level, the average lamp power dissipation level over the display period is maintained at a level that does not exceed the nominal lamp power dissipation level.

Once these steps have been accomplished, new image data can be provided, and the method which has just been described can be repeated beginning with that step of providing image data.

Figure 4A:
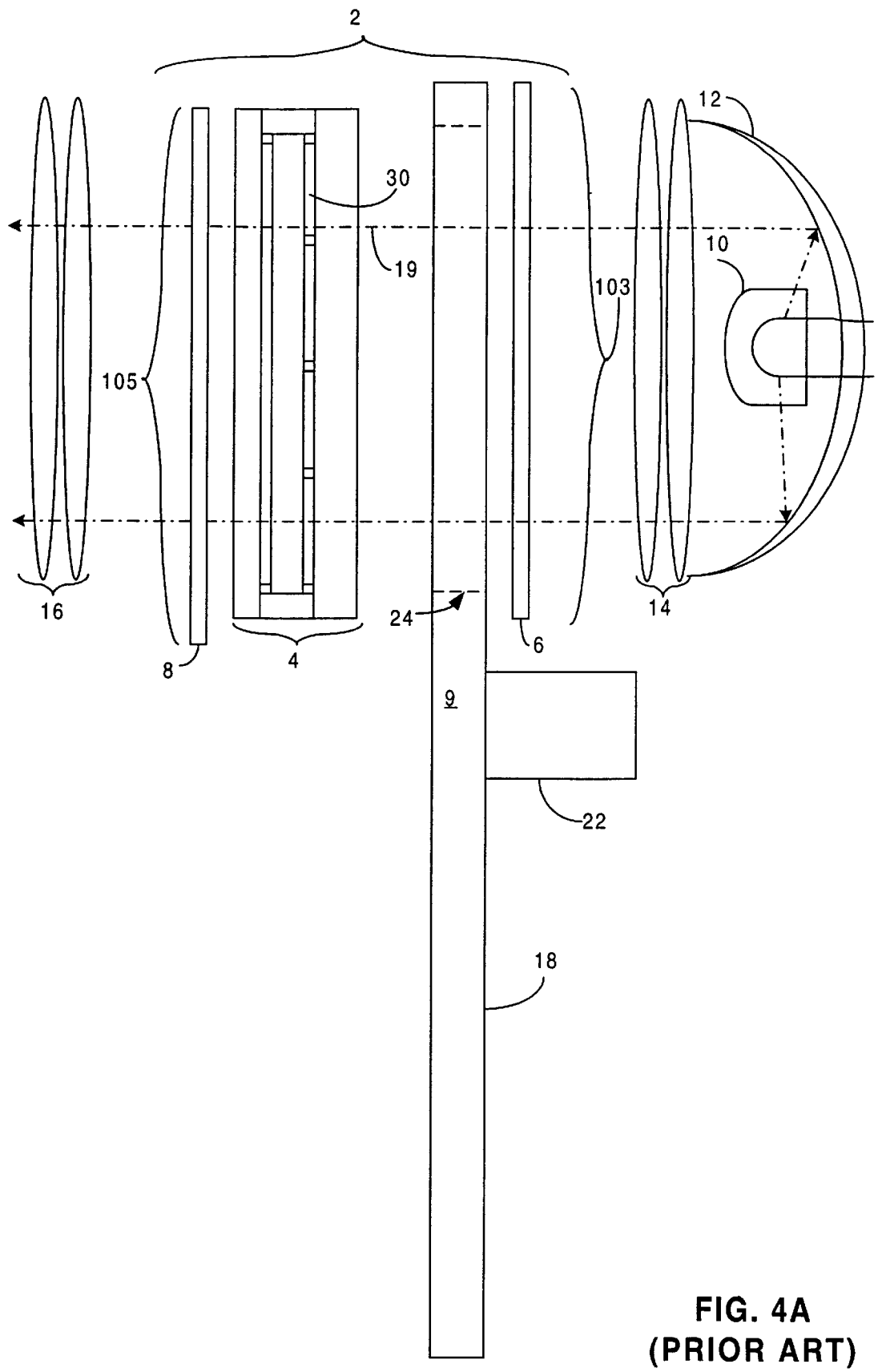
FIG. 4A is a schematic diagram of part of a prior art display device incorporating a conventional transmissive light valve with a single spatial light modulator.
Figure 4B:
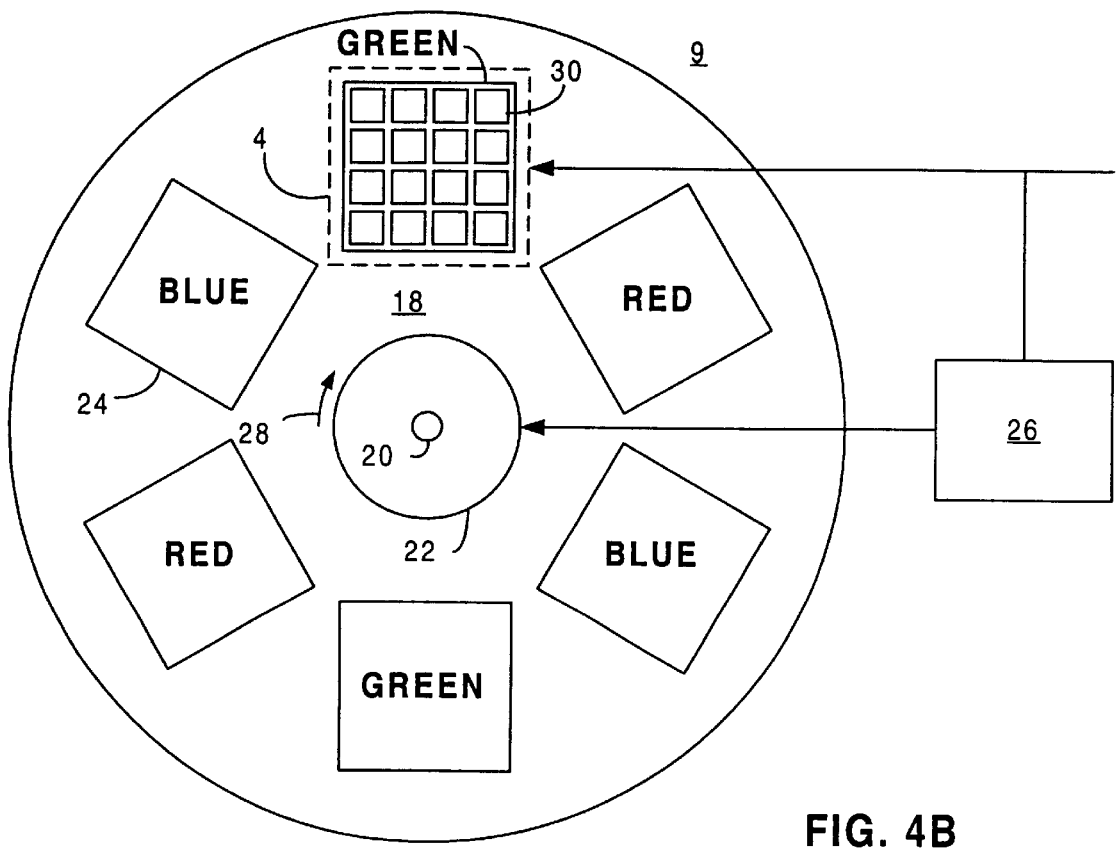
FIGS. 4B is a front view of a color sequencer like that depicted in FIG. 4A.
Figure 5:
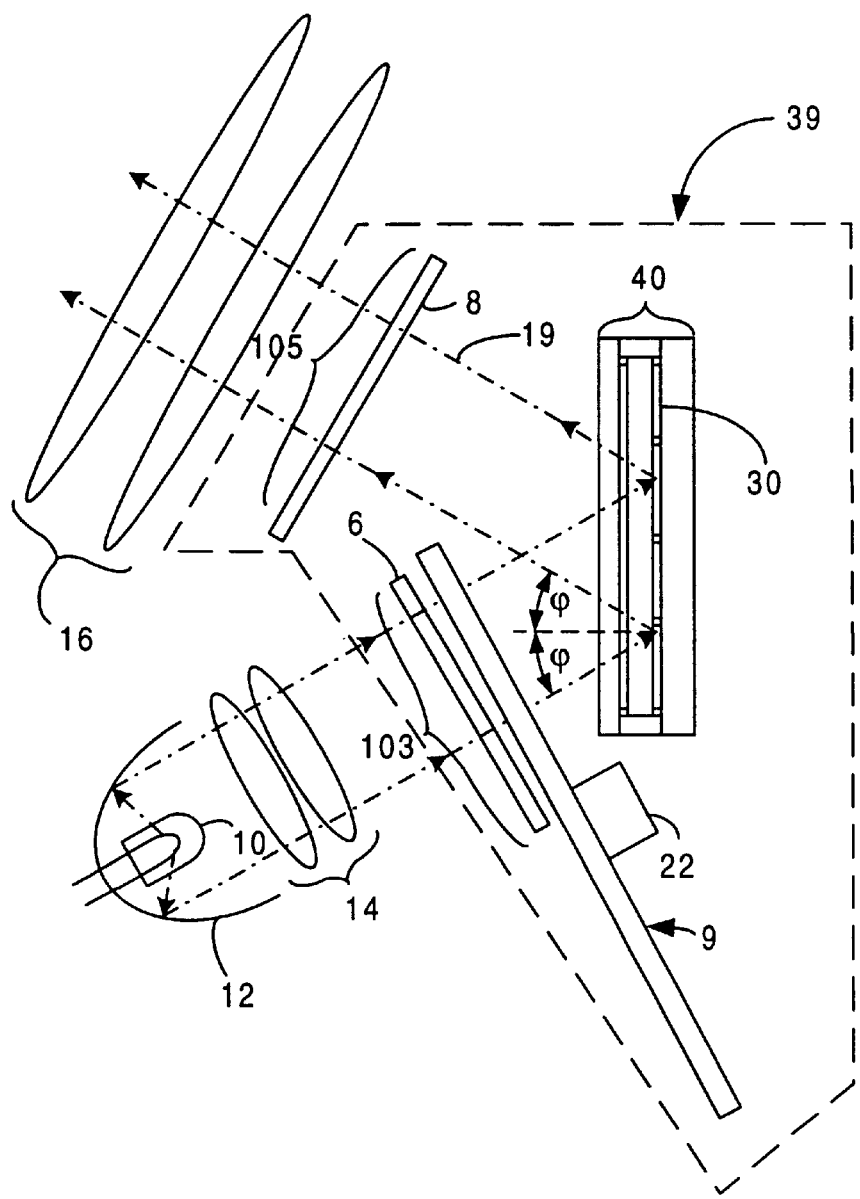
FIG. 5 is a schematic diagram of a part of a prior art display device incorporating a conventional reflective light valve with a single spatial light modulator.
Figure 6:
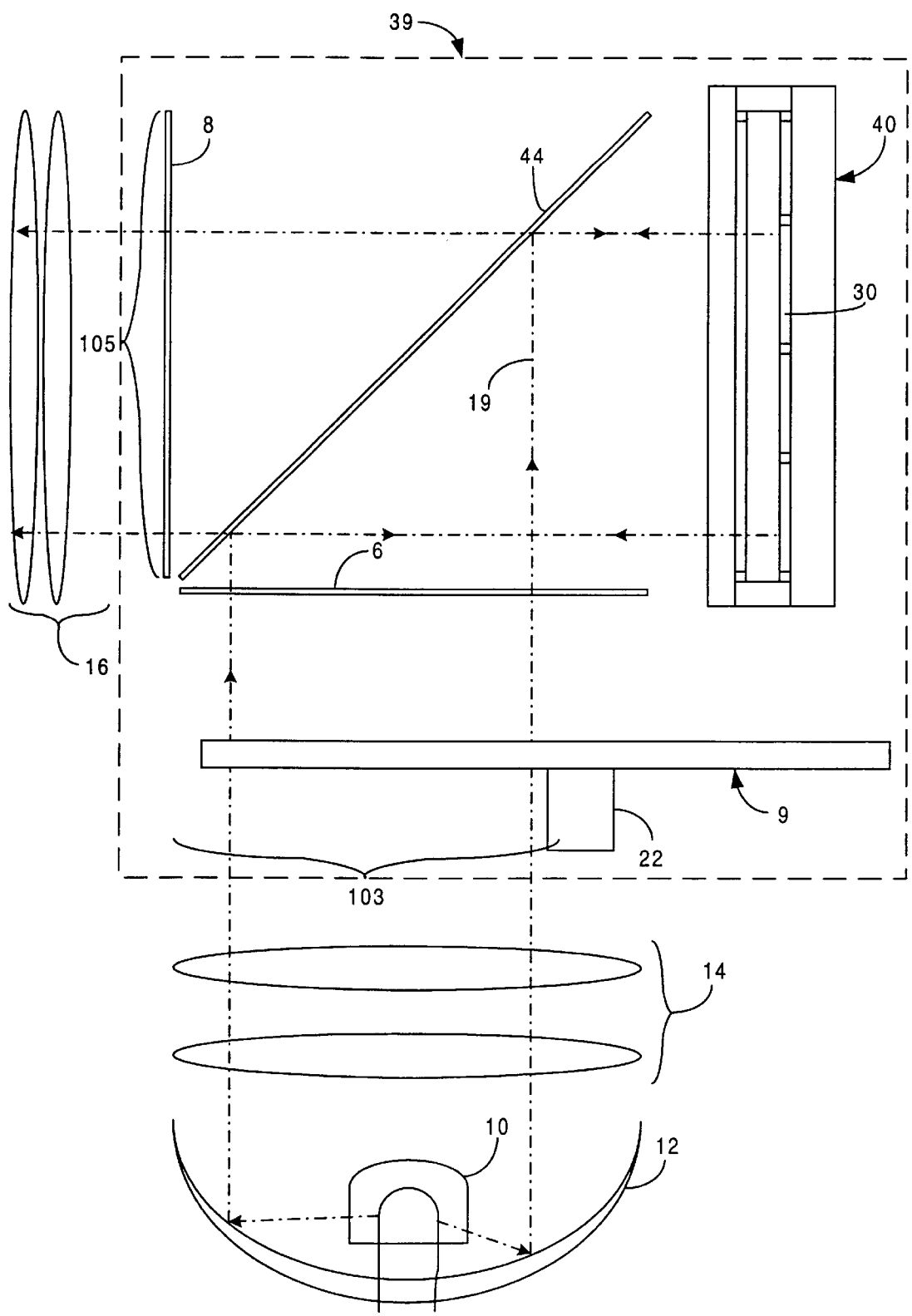
FIG. 6 is a schematic diagram of a part of a prior art display device incorporating a conventional reflective light valve with a single spatial light modulator and a beam splitter.

The method of illuminating a light valve with a light source with modulated intensity according to the invention can also be used very effectively with sequential color illumination type light valves like those shown in FIGS. 4A, 5, and 6 (including the color sequencer 9). These light valves operate with a single spatial light modulator 4, 40 which is sequentially illuminated with three colorbands of light (typically red, green, and blue). Each of these colorbands of light is sequentially modulated and exit the light valve through the light output 105. When the sequence is fast enough, the viewer will perceive the three individual colorband images as a single full-color image. If a full-color frame rate of 24 frames/second is used, then each colorband must be displayed for a period of approximately 1/72 second.

When used with sequential color illumination light valves, the method of illuminating a light valve with a light source of modulated intensity according to the invention begins by providing a light valve 2, 39. The light valve provided includes a light input 103, a light output 105, a spatial light modulator 4, 40, and a color sequencer 9. The spatial light modulator has an array of pixels, each pixel 30 in the array of pixels capable of modulating light traveling along an optical path 19 that intersects the pixel between the light input and the light output. The color sequencer sequentially selects one of a first, a second, and a third colorband of light that may reach the light output.

As before, the spatial light modulator is illuminated through the light input with light generated by a light source having a nominal lamp power dissipation level. The color sequencer is then set to allow the first colorband of light to pass towards the light output, and first colorband image data is provided to the spatial light modulator. The array of pixels is then configured based on the first colorband image data during a first colorband period so that the first colorband image data is represented in the first colorband light received at the light output. As previously described, configuring the array of pixels may include analog or digital configurations and may encode both positive and reverse representations of the first colorband image data, depending on the type of spatial light modulator included with the light valve.

Figure 12:
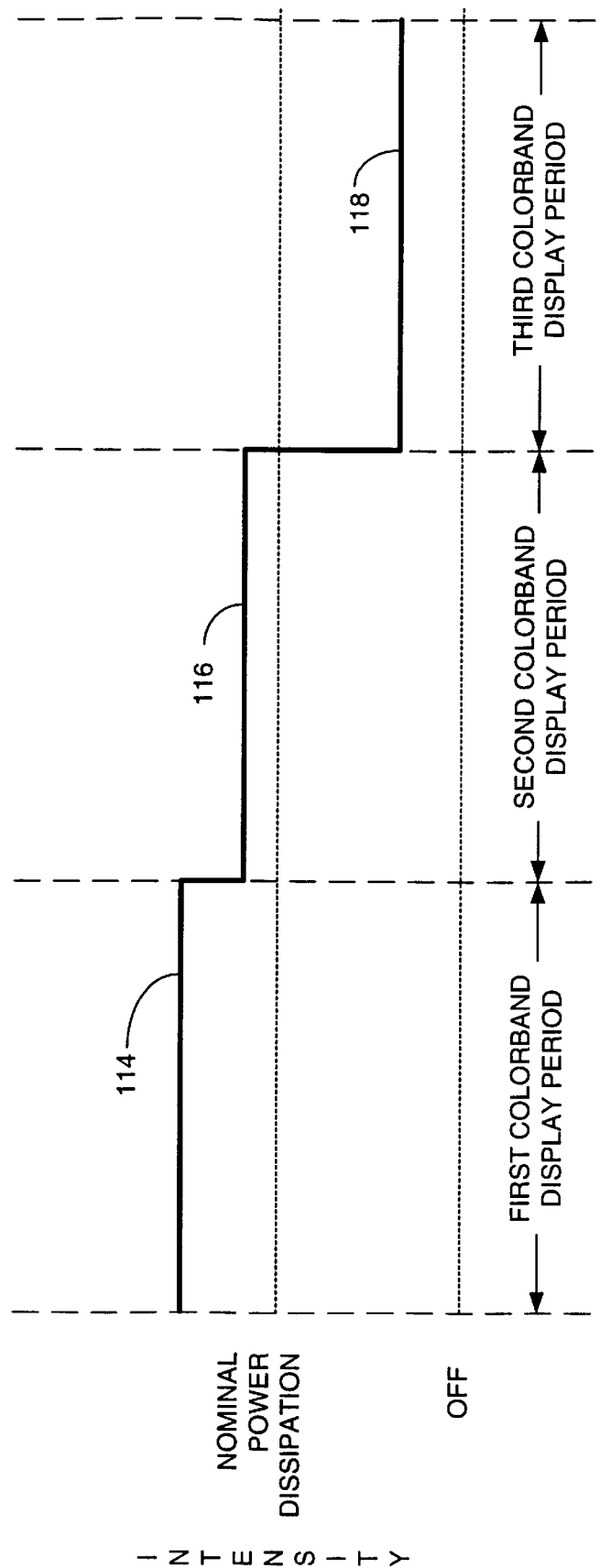
FIG. 12 illustrates the illumination of a light valve with a spatial light modulator and a color sequencer to improve light throughput and color balance according to the invention.

The intensity of the light generated by the light source during the first colorband period is then modulated. This modulation may include setting the intensity of the light generated by the light source 10 to a first high level 114 as shown in FIG. 12. This type of modulation may be used to improve color balance and throughput with light valves including spatial light modulators that do not require DC balancing.

Figure 13:
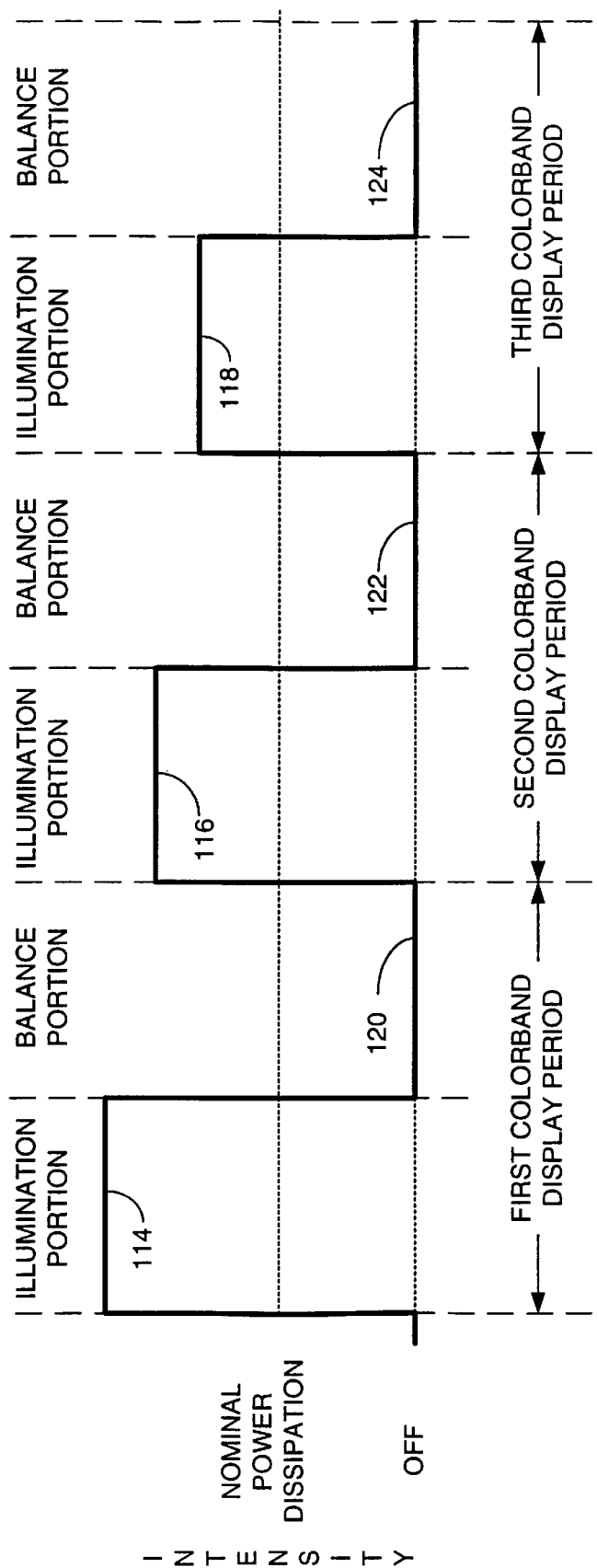
FIG. 13 illustrates the illumination of a light valve with a ferroelectric liquid crystal-based spatial light modulator and a color sequencer to improve light throughput and color balance according to the invention.

Alternatively, the modulation may include setting the intensity of the light generated by the light source to a first high level 114 during one portion of the first colorband period and setting the intensity of the light generated to a first low level 120 during another portion of the first colorband period as shown in FIG. 13. This type of modulation may be used to improve color balance and throughput with light valves that include spatial light modulators that require DC balanced operation such as ferroelectric liquid crystal-based spatial light modulators. When the spatial light modulator is ferroelectric liquid crystal-based, it is preferable that the first low level 120 be set approximately to the off level of the light source. As previously discussed, the order, relative duration, and frequency of the first high level and first low level may be adjusted within the first colorband period to match the characteristics of other types of spatial light modulators.

Next, the color sequencer 9 is set to allow the second colorband of light to pass to the light output 105 and second colorband image data is provided to the spatial light modulator. The array of pixels is then configured based on the second colorband image data during a second colorband period so that the second colorband image data is represented in the second colorband light received at the light output.

The intensity of the light generated by the light source during the second colorband period is then modulated. This modulation may include setting the intensity of the light generated by the light source 10 to a second high level 116 as shown in FIG. 12. Alternatively, the modulation may include setting the intensity of the light generated by the light source to a second high level 116 during one portion of the second colorband period and setting the intensity of the light generated to a second low level 122 during another portion of the second colorband period as shown in FIG. 13. When the spatial light modulator is ferroelectric liquid crystal-based, it is preferable that the second low level 122 be set approximately to the off level of the light source. In addition, the order, relative duration, and frequency of the second high level and second low level may be adjusted within the second colorband period to match the characteristics of the spatial light modulator.

Next, the color sequencer 9 is set to allow the third colorband of light to pass to the light output 105 and third colorband image data is provided to the spatial light modulator. The array of pixels is then configured based on the third colorband image data during a third colorband period so that the third colorband image data is represented in the third colorband light received at the light output.

The intensity of the light generated by the light source during the third colorband period is then modulated. This modulation may include setting the intensity of the light generated by the light source 10 to a third high level 118 as shown in FIG. 12. Alternatively, the modulation may include setting the intensity of the light generated by the light source to a third high level 116 during one portion of the third colorband period and setting the intensity of the light generated to a third low level 124 during another portion of the third colorband period as shown in FIG. 13. When the spatial light modulator is ferroelectric liquid crystal-based, it is preferable that the third low level 124 be set approximately to the off level of the light source. In addition, the order, relative duration, and frequency of the third high level and third low level may be adjusted within the third colorband period to match the characteristics of the spatial light modulator.

The modulation of the intensity of the light generated by the light source in each of the first, the second, and the third colorband periods may be adjusted to adjust the color balance of the first, the second, and the third colorband of light at the light output. For example, the first, second, and third colorbands may be blue, red and green colorbands, respectively, and a particular light source may have a strong green colorband relative to the red and blue colorbands. Further, the red colorband may be stronger than the blue colorband.

Referring to FIGS. 12 and 13, the first colorband period (during which modulation of the weak blue colorband occurs) includes modulation with a first high level 114 that is higher than the second or third high level. This highest high level offsets the weak blue colorband generated by the light source and equalizes the blue colorband relative to the red colorband and green colorband in at the light output. The second colorband period (during which modulation of the red colorband occurs) includes modulation with a second high level 116 that is higher that the third high level 118, but below the first high level 114. This second high level offsets the slightly weak red colorband generated by the light source and equalizes the red colorband relative to the blue and green colorbands at the light output. The third colorband period (during which modulation of the strong green colorband occurs) includes modulation with a third high level 118 that is the lowest of the high levels. This third high level offsets the strong green colorband generated by the light source and equalizes the green colorband relative to the blue and red colorbands at the light output.

The actual magnitude of each of the first, the second, and the third high level 114, 116, 118, may be preset by the manufacturer based on the characteristics of the spatial light modulator included with the light valve. Additionally, a color balance feedback system may be used to set or fine tune the magnitude of the first, second, and third high level. In a color balance feedback system, the actual intensity of each of the first, second, and third colorbands of light are measured, and based on these measurements, the magnitude of each of the first, second, and third high levels are adjusted in order to balance the intensity of the first, second, and third colorband of light.

Further, the method according to the invention may also be used to give color balance control to the user of the display in which the light valve is located. This can be accomplished by providing a color balance user interface which allows the user to select a desired color balance level. The color balance user interface may be any type of such user interfaces known in the art including one or more color balance knobs, digital on-screen control, or one or more up/down pushbutton type controls. The user's inputs received at the color balance user interface are then used to set the first, second, and third high level 114, 116, 118 and/or the first, second, and third low level 120, 122, 124 at levels that provide the user with the desired color balance.

No matter how the first, second, and third high level 114, 116, 118 and/or the first second, and third low level 120, 122, 124 are set, the average lamp power dissipation level over the total duration of first, second, and third colorband periods must be maintained at a level that does not exceed the nominal lamp power dissipation level. This may mean that one or more of the first, second, and third high levels 114, 116, 118 may need to be set at a level below the nominal power dissipation level as is illustrated with the third high level 118 in FIG. 12.

Once all three colorbands periods have elapsed, new first colorband image data may be provided and the process may repeat from that point forward.

Figure 7:
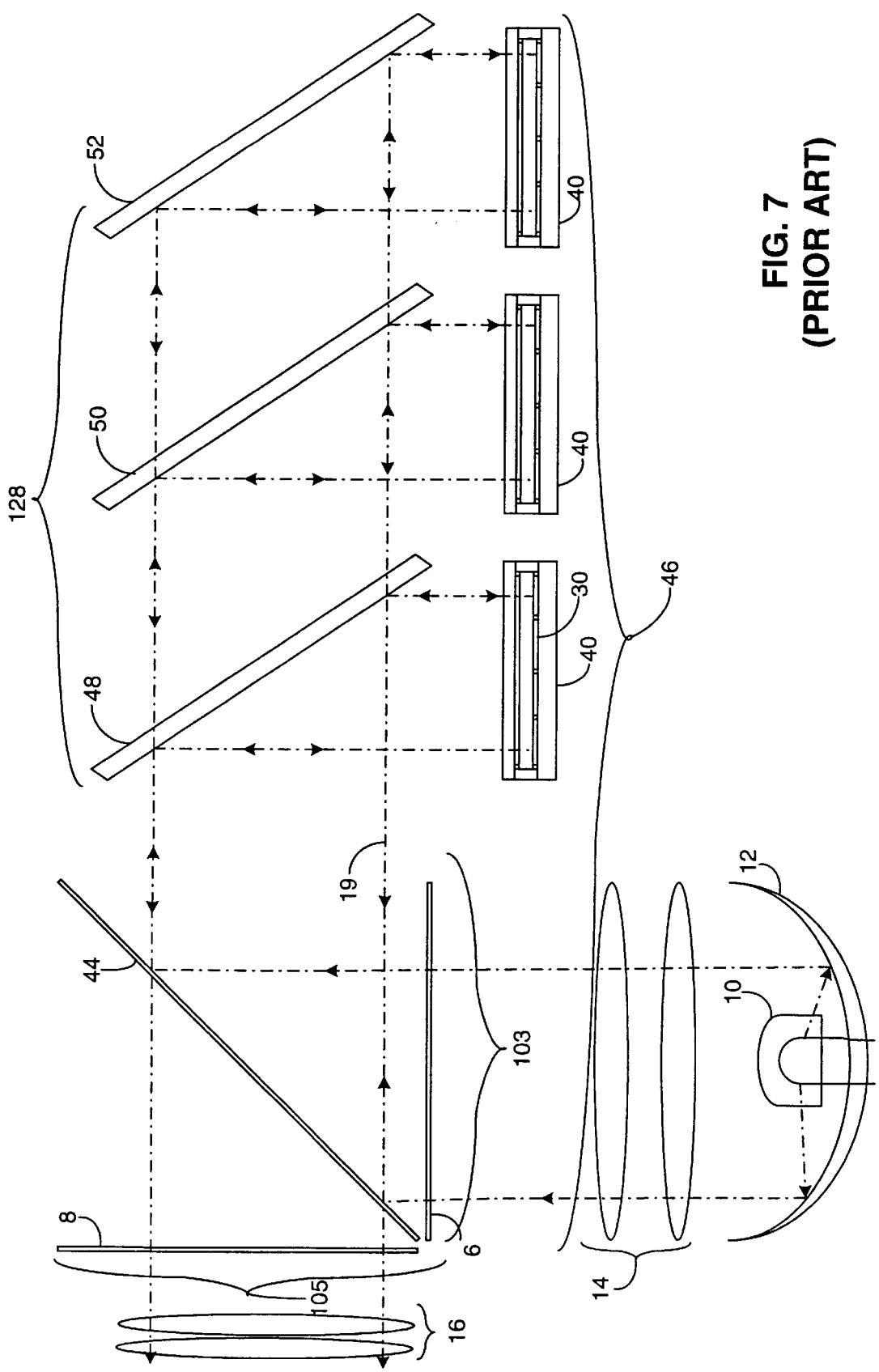
FIG. 7 is a schematic diagram of a part of a prior art display device incorporating a conventional reflective light valve with three spatial light modulators and dichroic plates.
Figure 8:
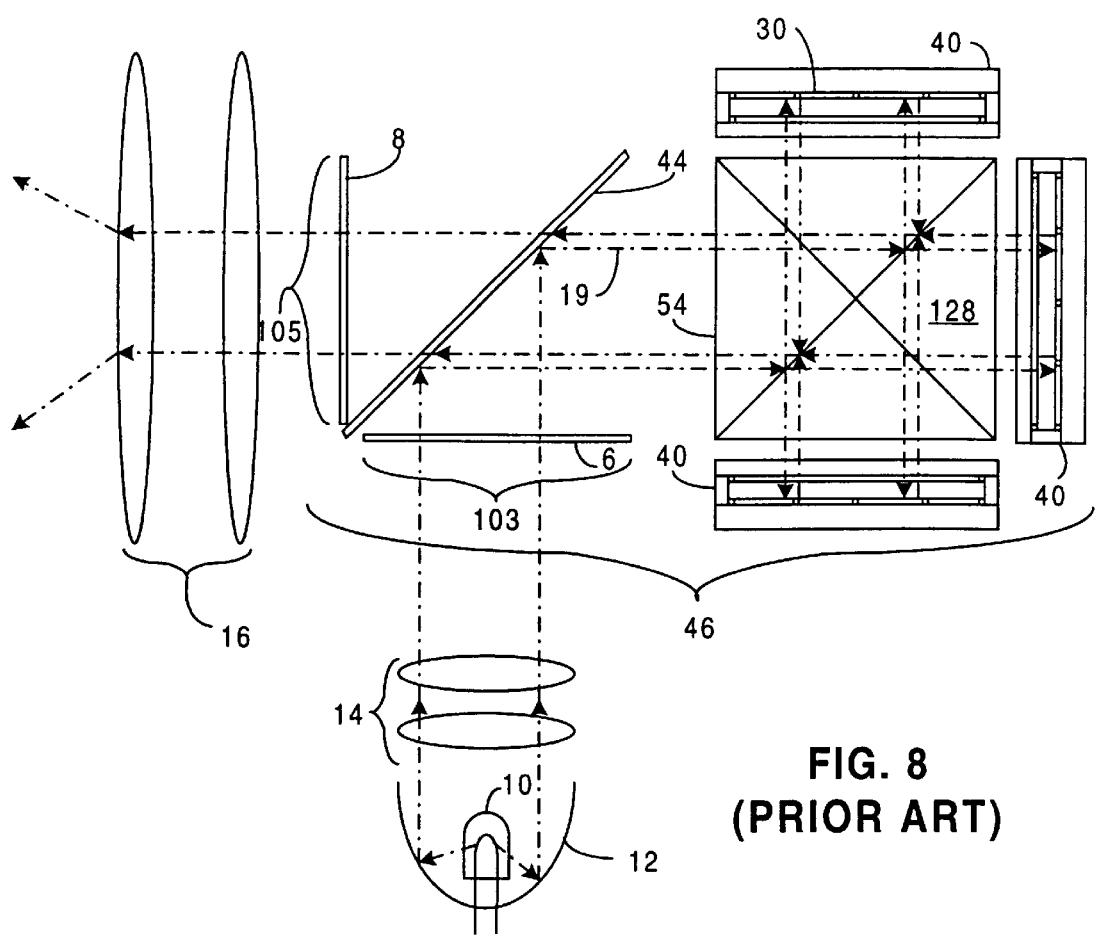
FIG. 8 is a schematic diagram of a part of a prior art display device incorporating a conventional reflective light valve with three spatial light modulators and a color separation cube.
Figure 9:
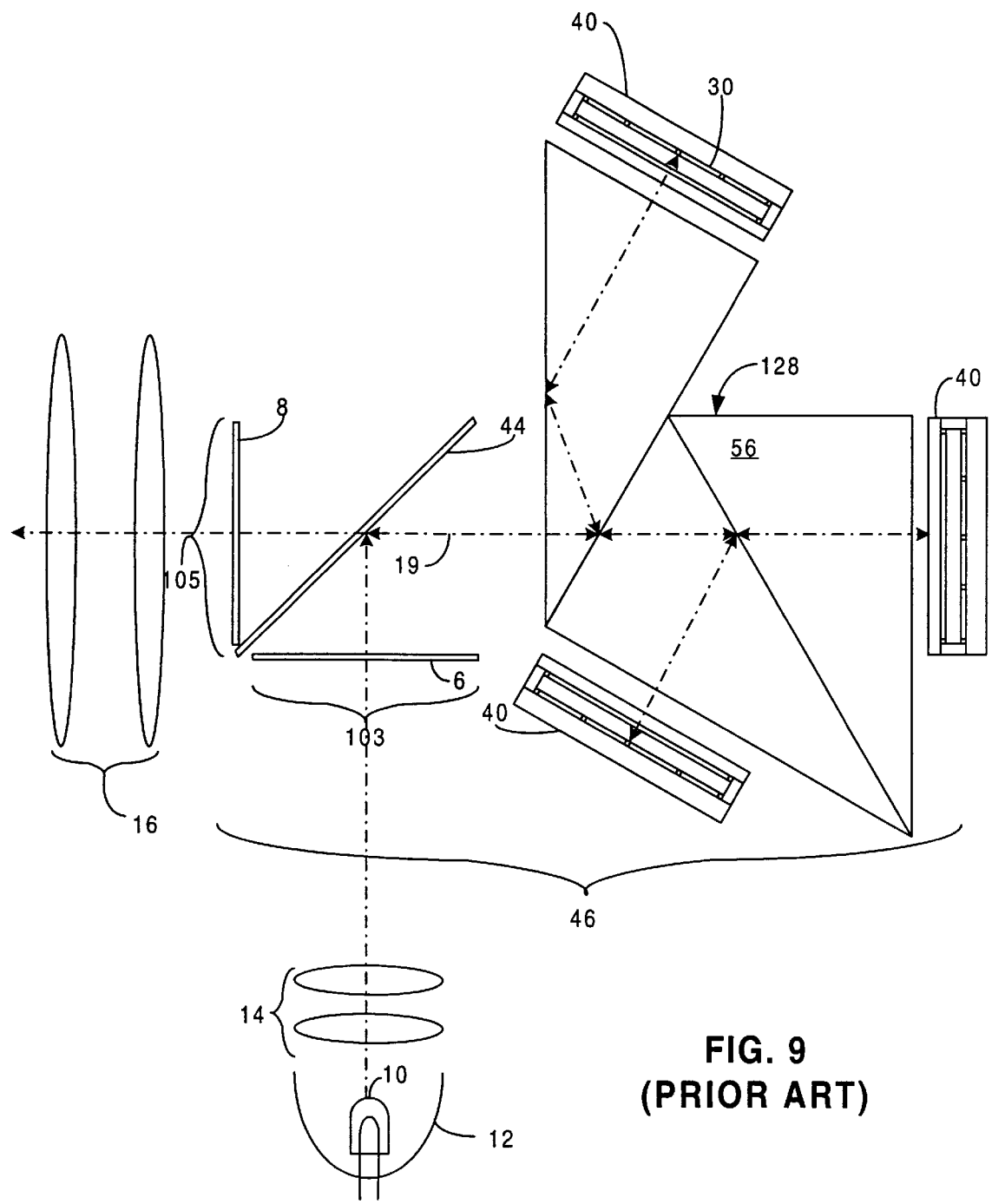
FIG. 9 is a schematic diagram of a part of a prior art display device incorporating a conventional reflective light valve with three spatial light modulators and a three-prism color separator.

The method of illuminating a light valve with a light source with modulated intensity according to the invention can also be used very effectively with light valves 46 like those shown in FIGS. 7, 8, and 9 including three spatial light modulators 40. These light valves operate with a first, second, and third spatial light modulator which are simultaneously illuminated with the first, the second, and the third colorband, respectively. Each of these colorbands of light is simultaneously modulated and exit the light valve through the light output simultaneously to form a single full-color image.

When used with a color light valve including three spatial light modulators, the method of illuminating a light valve with a light source of modulated intensity according to the invention begins by providing a light valve 46. The light valve provided includes a light input 103, a light output 105, a first, second, and third spatial light modulator 40, and a color separator 128. The first, second, and third spatial light modulator include a first, second, and third array of pixels. Each pixel 30 in each of the first, second, and third array of pixels is capable of modulating light traveling along an optical path 19 that intersects the pixel between the light input and the light output. The color separator directing a first, a second, and a third colorband of light from light received at the light input to the first, the second, and the third spatial light modulator, respectively. The color separator may take any of a number of forms known in the art, including the three dichroic plates 48, 50, 52 shown in FIG. 7, the color separation cube 54 shown in FIG. 8, or the three prism color separator 56 shown in FIG. 8.

The color separator 128 is illuminated through the light input 103 with light generated by a light source 10 having a nominal lamp power dissipation level. First, second, and third colorband image data is then provided to the first, second and third spatial light modulators, respectively. Each of the first, second, and third array of pixels is then configured based on the first, second, and third colorband image data, respectively, during a display period. Thus, the first, second, and third colorband image data are represented in the first, second, and third colorband light, respectively, received at the light output 105. As previously described, configuring the each of the first, second, and third array of pixels may include analog or digital configurations and may encode both positive and reverse representations of the first colorband image data, depending on the type of first, second, and third spatial light modulator included with the light valve.

Figure 14:
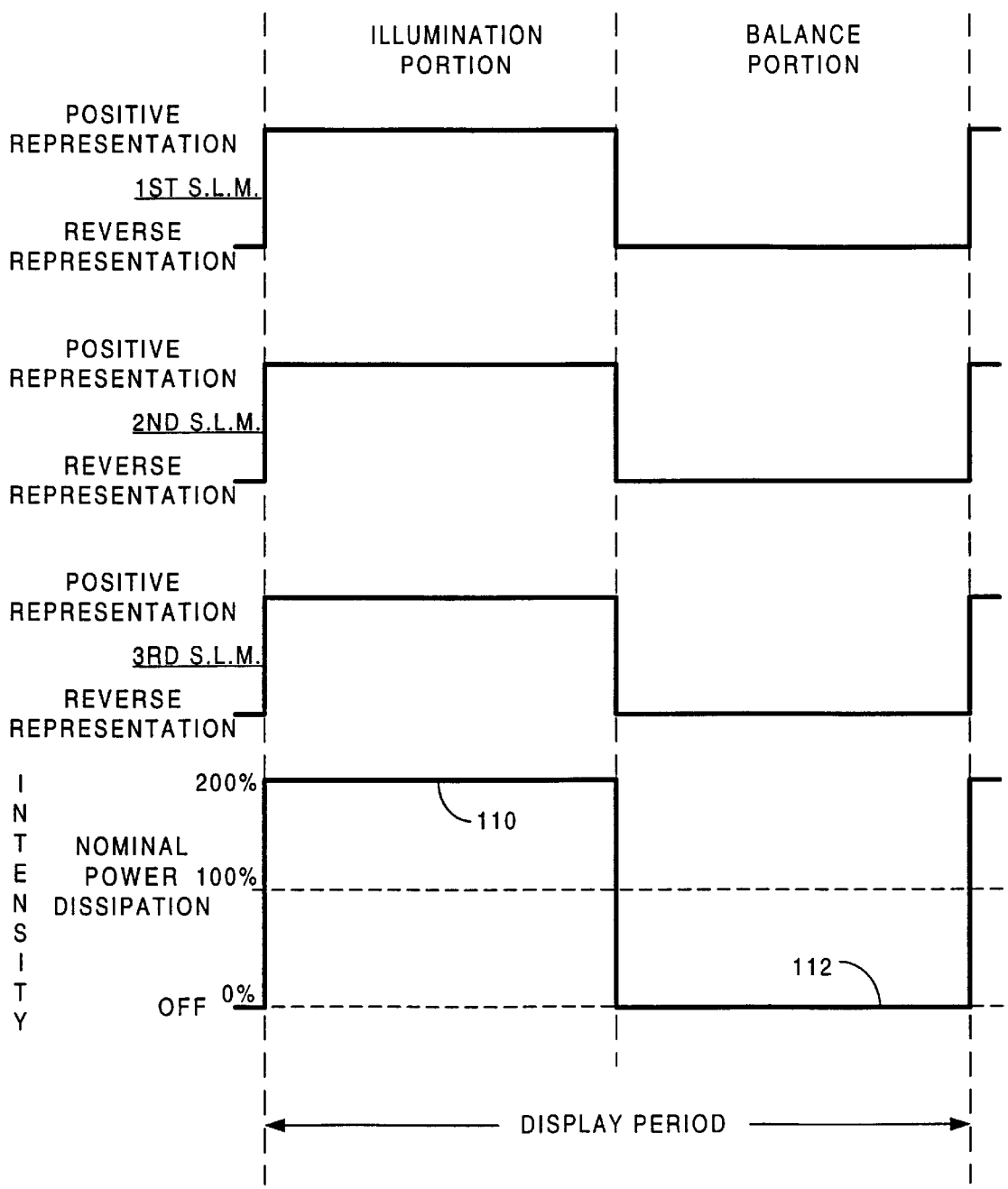
FIG. 14 illustrates the illumination of a light valve with three spatial light modulators and a color separator to improve light throughput according to the invention.

The intensity of the light generated by the light source 10 is then modulated during the display period as depicted in FIG. 14. As shown, the intensity of the light is increased to a high level 110 above the nominal lamp power dissipation level for a portion of the display period and is also decreased to a low level 112 below the nominal power dissipation level for another portion of the display period. While the increase in intensity level to high level 110 occurs before the decrease in intensity level to low level 112 in FIG. 13, the order is not important and may be reversed. Further, while only a single longer high level 110 and a single longer low level 112 as shown in the display period, these could easily be replaced by numerous shorter high level 110 and low level 112 periods could take place during the display period.

In FIG. 14, the high and low levels are shown for a light valve in which the first, second, and third spatial light modulators are ferroelectric liquid crystal-based. Thus, the portion of the display period during which the intensity is increased to high level 110 substantially corresponds to the illumination portion of the display period. In addition, the portion of the display period during which the intensity is decreased to low level 112 substantially corresponds to the balance portion of the display period. Also, the high level 110 has a magnitude of approximately 200% of the nominal power dissipation level, and the low level 112 corresponds to an "off" condition of the light source.

The method of illumination according to the invention may be used with light valves including other types of spatial light modulators as well. In such a case, the relative duration of the high level 110 to the low level 112 during the display period, and the magnitude of high level 110 and low level 112 would be altered to provide the best light throughput for the characteristics of the spatial light modulators involved.

Figure 15:
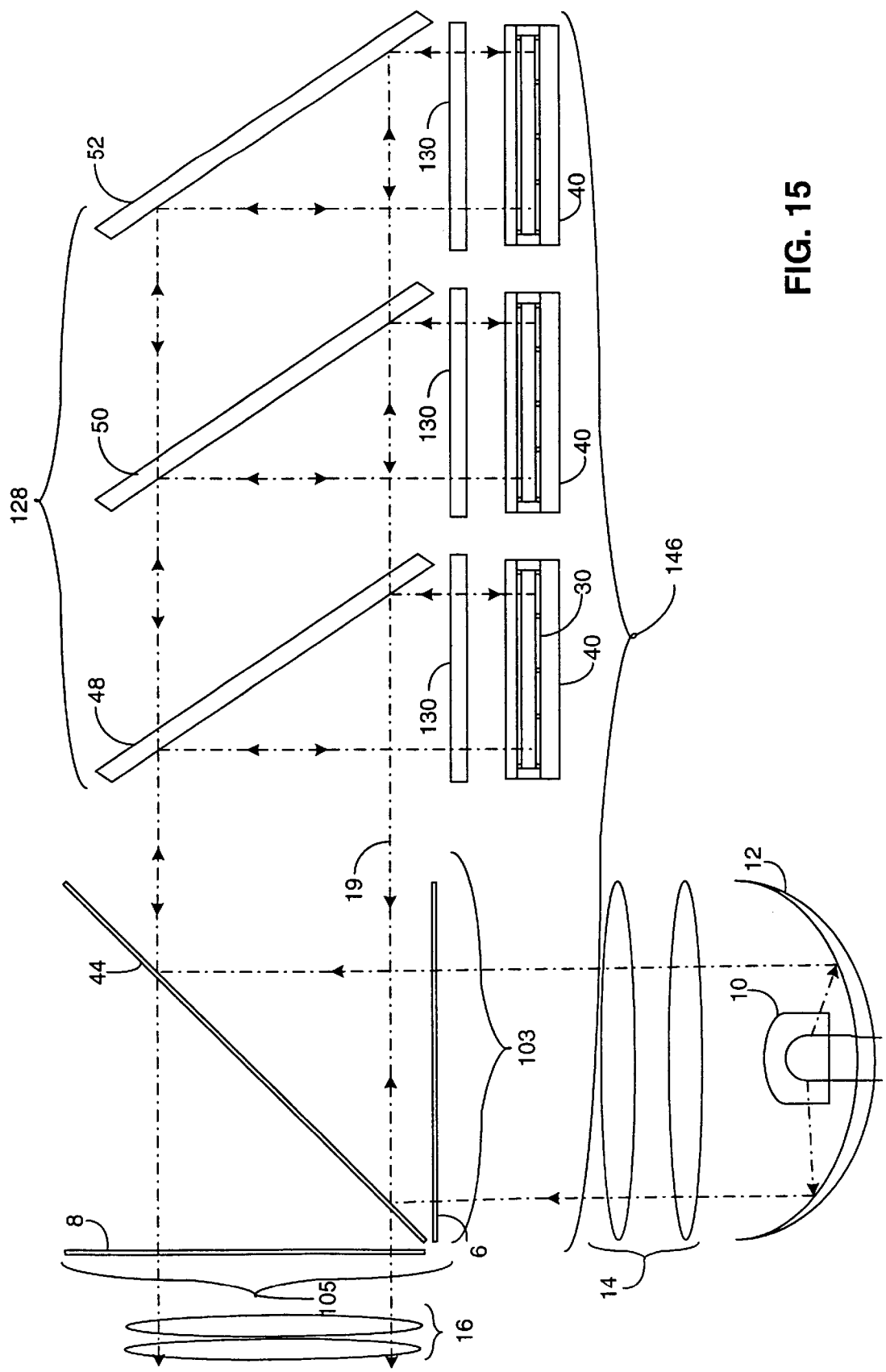
FIG. 15 is a schematic diagram of a part of a display device similar to that shown in FIG. 7 but incorporating three shutters between the color separator and the three spatial light modulators.
Figure 16:
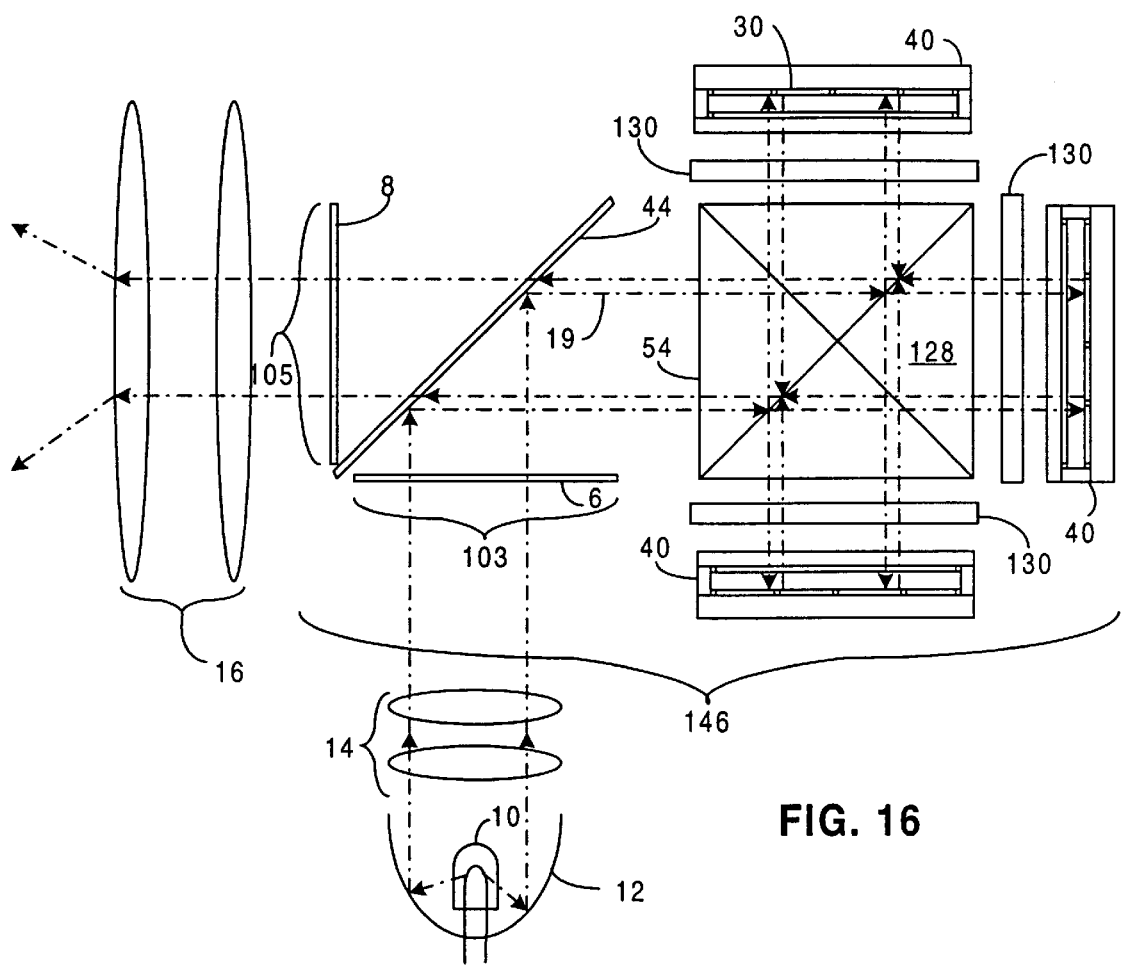
FIG. 16 is a schematic diagram of a part of a display device similar to that shown in FIG. 8 but incorporating three shutters between the color separator and the three spatial light modulators.
Figure 17:
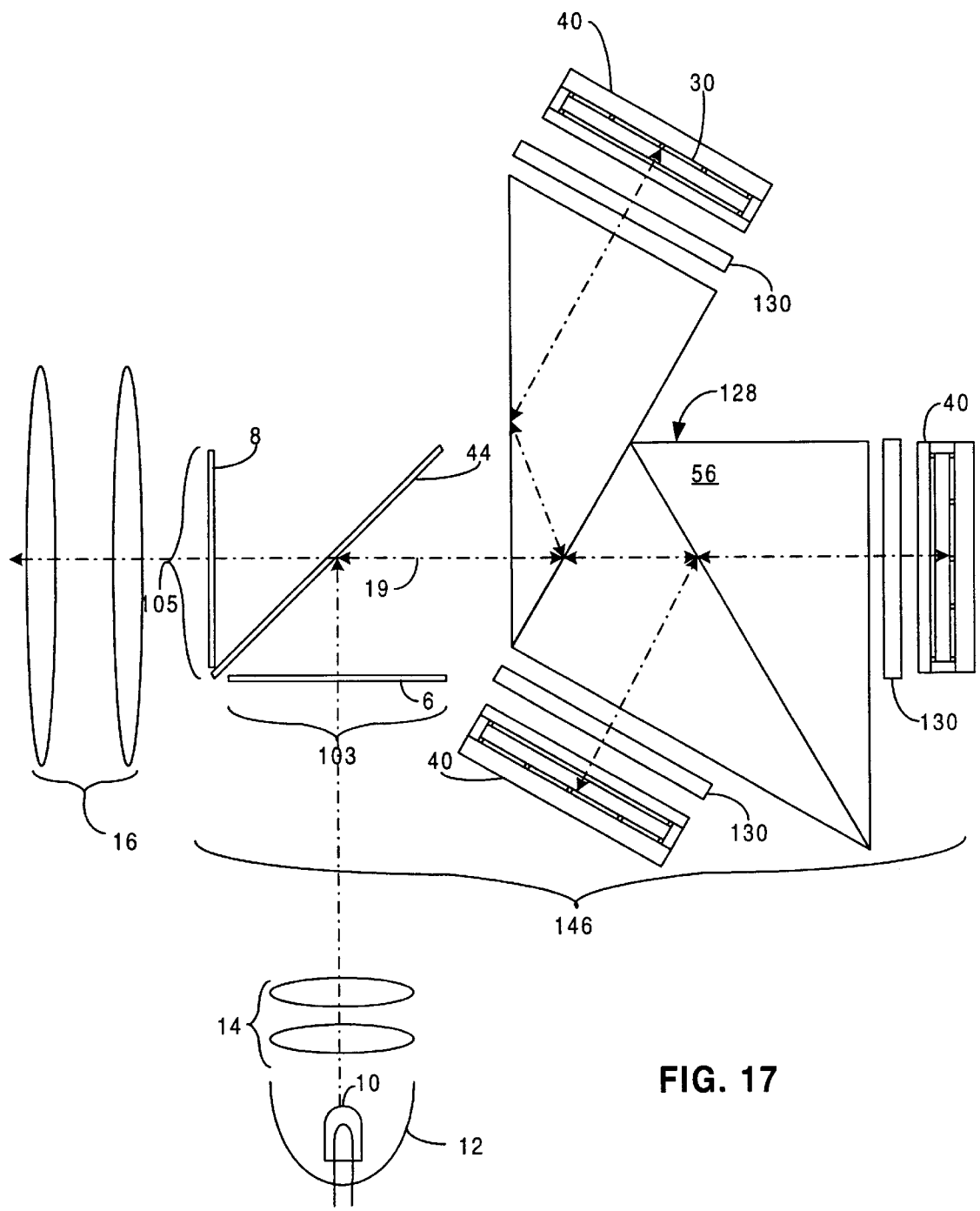
FIG. 17 is a schematic diagram of a part of a display device similar to that shown in FIG. 9 but incorporating three shutters between the color separator and the three spatial light modulators.

The modulation of the light generated by the light source 10 as depicted in FIG. 13 would certainly improve the light throughput of the light valve 146, but would do little to improve the color balance of the light valve. In order to most effectively use the method of illuminating the light valve according to the invention to improve color balance of the light valve, the three spatial light modulator light valve provided need to be slightly modified from the prior art light valves depicted in FIGS. 7–9. Modified light valves 146 similar to those prior art light valves are depicted in FIGS. 15–17, respectively. Each of the modified light valves 146 includes first, second, and third shutters 130 located along the optical path 19 between the color separator 128 and the first, the second, and the third spatial light modulators 40.

Each of the shutters 130 is independently switchable between an OPEN state and a CLOSED state. In the OPEN state, the shutter allows light to freely pass between the color separator 128 and the spatial light modulator 40 along the optical path 19, as it would as if no shutter were present. In the CLOSED state, however, the shutter prevents the light generated by the light source 10 from traveling along the optical path 19 between the color separator 128 and the spatial light modulator 40. The light generated by the light source is typically either absorbed by the shutter or reflected by the shutter away from the optical path. Shutters for blocking light traveling along an optical path are known in the art and include mechanical shutters such as blade, curtain, and plate shutters, as well as liquid crystal-based shutters as described in U.S. Pat. No. 5,029,987 issued Jul. 9, 1991 and entitled "Ferroelectric liquid crystal shutter."

Illuminating the modified light valves 146 using the method according to the invention is similar to the previously described method for illuminating light valves 46 that include three spatial light modulators 40. The color separator 128 is illuminated through the light input 103 with light generated by a light source 10 having a nominal lamp power dissipation level. First, second, and third colorband image data is then provided to the first, second and third spatial light modulators, respectively. To control the color balance of the light valve, however, configuring the first, second, and third array of pixels based on the first, second, and third colorband image data, respectively, additionally includes altering the timing of the configuration of at least one of the first, second, and third array of pixels. More specifically, color balance of the light valve 146 is controlled by coordinating the switching of the first, second, and third shutters between the OPEN state and the CLOSED state, the timing of the configuration of each of the first, second, and third array of pixels, respectively, and the modulation of the intensity of the light generated by the light source during a display period.

Figure 18:
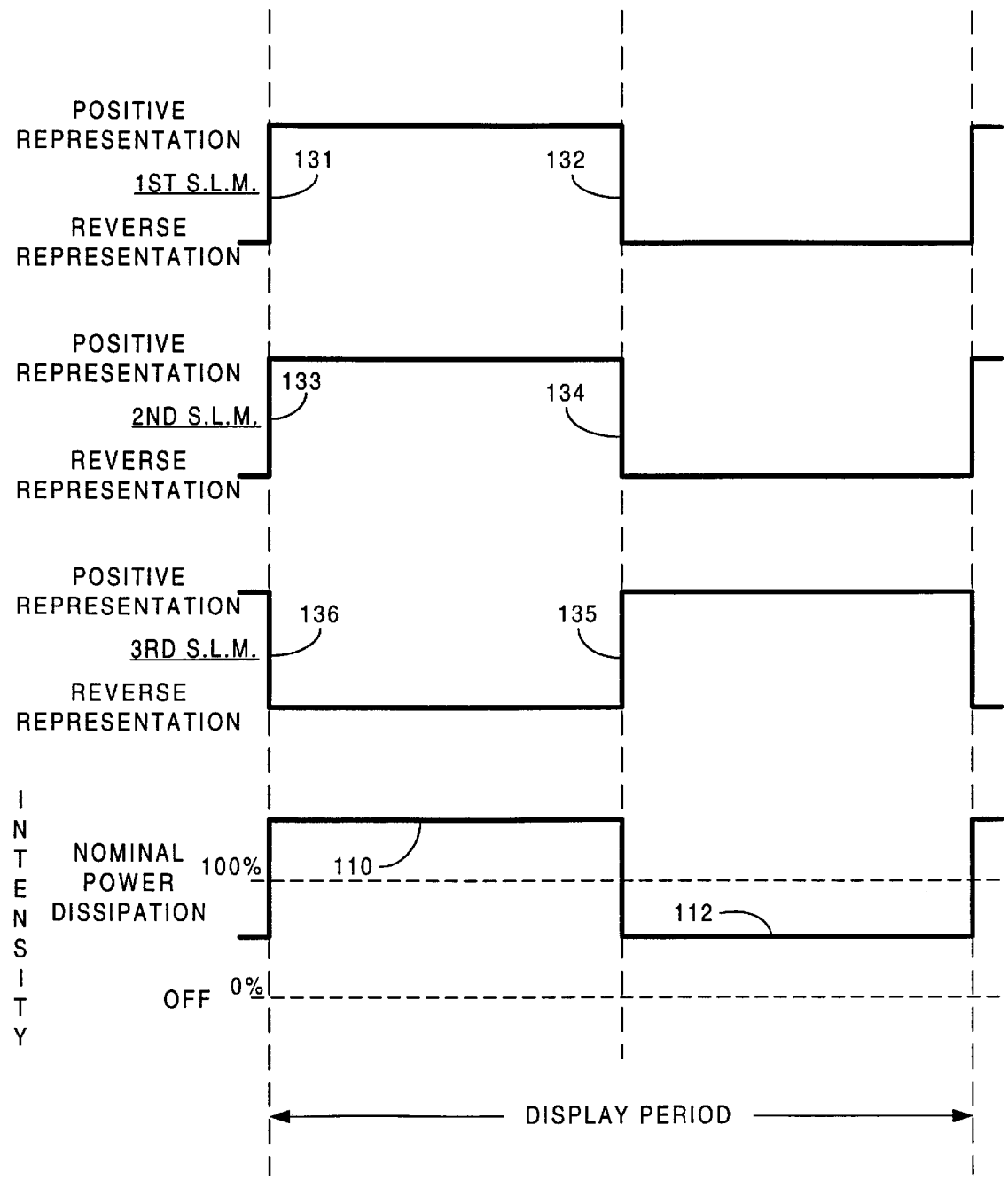
FIG. 18 illustrates the illumination of a light valve with three spatial light modulators and a color separator with operation of one spatial light modulator inverted to improve light throughput and color balance according to the invention.

An example of this type of coordination for improving color balance using the method of illumination of a light valve according to the invention is illustrated in FIG. 18. For purposes of this illustration, it is presumed that for a given intensity of the light generated by the light source, the third colorband of light illuminating the third spatial light modulator (S.L.M.) has an intensity three times that of the first and second colorbands of light illuminating the first and second spatial light modulators, respectively. It is also presumed that each of the first, second, and third spatial light modulators is ferroelectric liquid crystal-based. As previously described, the intensity of the light generated by the light source 10 is modulated during the display period by increasing to a high level 110 above the nominal lamp power dissipation level for a portion of the display period and also decreasing to a low level 112 below the nominal power dissipation level for another portion of the display period. In this instance, the high level 110 has a magnitude of approximately 150% of the nominal power dissipation level, and the low level has a magnitude of approximately 50% of the nominal power dissipation level.

Configuring the first and second array of pixels based on the first and second colorband image data, respectively, then occurs as previously described and illustrated in FIG. 14. The third array of pixels, however, is configured based on the third colorband image data with inverted timing so that while the first and second array of pixels are configured to encode a positive representation, the third array of pixels is configured to encode a reverse representation, and vise versa. Thus, the illumination portion and balance portion of the display period for the third spatial light modulator are inverted from the illumination portion and the balance portion of the display period for the first and second spatial light modulator.

Since the light source 10 is generating light during both the illumination portion and balance portion of the display period for each of the first, second, and third spatial light modulator, the first, second, and third shutter 130 are used to prevent the reverse representation of the first, second, and third colorband image data, from reaching the light output 105. Otherwise, the reverse representations would interfere with proper display of the positive representations at the light output.

Specifically, the first shutter is switched to an OPEN state 131 as the first spatial light modulator is configured to encode a positive representation of the first colorband image data (its illumination portion) in the first colorband of light. The first shutter is then switched to a CLOSED state 132 as the first spatial light modulator is configured to encode a reverse representation of the first colorband image data (its balance portion). Similarly, the second shutter is switched to an OPEN state 133 as the second spatial light modulator is configured to encode a positive representation of the second colorband image data (its illumination portion) in the second colorband of light. The second shutter is then switched to a CLOSED state 134 as the second spatial light modulator is configured to encode a reverse representation of the second colorband image data (its balance portion). Likewise, the third shutter is switched to an OPEN state 135 as the third spatial light modulator is configured to encode a positive representation of the third colorband image data (its illumination portion) in the third colorband of light. The third shutter is then switched to an CLOSED state 136 as the third spatial light modulator is configured to encode a reverse representation of the third colorband image data (its balance portion).

By coordinating the time of the configuration of each of the first, second, and third array of pixels, with the switching of the first, second, and third shutters, and the modulation of the light source color balance is achieved. In the example depicted in FIG. 18, the positive representations of the first and second colorband image data are encoded in the first and second colorband of light, respectively, while the intensity of the light generated by the light source 10 is at the high level 110. In contrast, the positive representation of the third colorband image data is encoded in the relatively more intense third colorband of light while the intensity of the light generated by the light source is at the low level 112. Color balance is achieved in this example since the low level has a magnitude of intensity one-third that of the high level, and the third colorband has a relative intensity three times that of the first and second colorbands of light. Thus, the intensity of the third colorband during the low level illumination will be equal to the intensity of the first and second colorband during the high level illumination and color balance will be achieved In practice, the high level 110 and the low level 112 can be set based on the relative intensity of each of the first, second, and third colorbands of light at a given intensity of the light generated by the light source 10. The levels must be set a levels, however, so that the average lamp power dissipation level over the display period is maintained at a level that does not exceed the nominal lamp power dissipation level.

Figure 19:
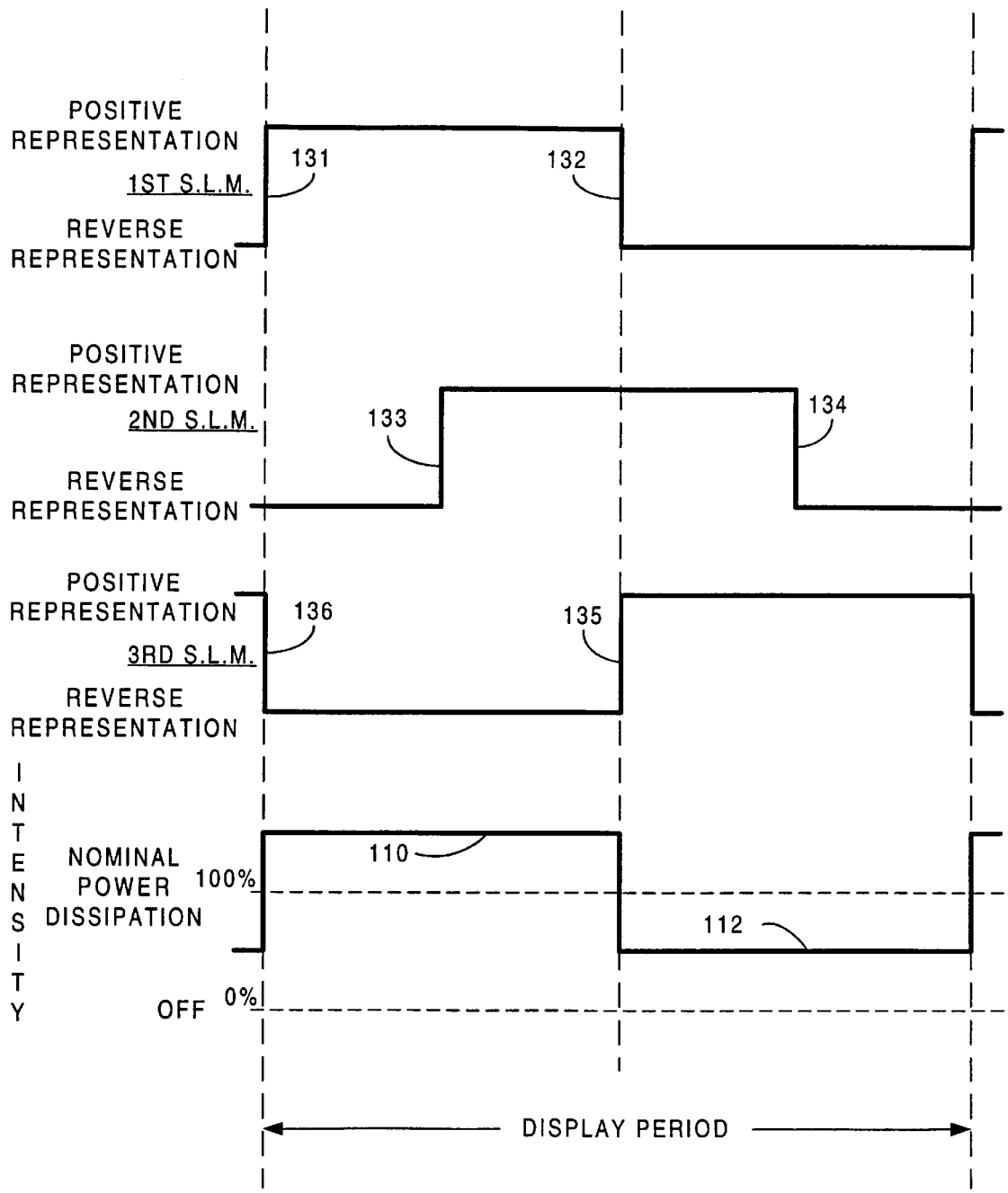
FIG. 19 illustrates the illumination of a light valve with three spatial light modulators operating in a staggered manner to improve light throughput and color balance according to the invention.

An example of another type coordination useful for improving color balance using the method of illumination according to the invention is illustrated in FIG. 19. For purposes of this illustration, it is presumed that for a given intensity of the light generated by the light source, the first, second, and third colorbands of light have relative intensities with a ratio of 1:1.5:3, respectively. It is also presumed that each of the first, second, and third spatial light modulators is ferroelectric liquid crystal-based. As in the previously illustrated example, the intensity of the light generated by the light source 10 is modulated during the display period by increasing to a high level 110 above the nominal lamp power dissipation level for a portion of the display period and also decreasing to a low level 112 below the nominal power dissipation level for another portion of the display period. The high level 110 has a magnitude of approximately 150% of the nominal power dissipation level, and the low level has a magnitude of approximately 50% of the nominal power dissipation level.

Configuring the first array of pixels based on the first colorband image data occurs as previously described and illustrated in FIG. 14. Configuring the third array of pixels based on the third colorband image data with inverted timing relative to the first array of pixels occurs as previously described and illustrated in FIG. 18. Thus, the illumination portion and balance portion of the display period for the third spatial light modulator are inverted from the illumination portion and the balance portion of the display period for the first spatial light modulator. The second array of pixels is configured so that the positive representation of the second colorband image data is encoded in the second colorband of light with staggered timing. Specifically, the second array of pixels begins encoding the positive representation of the second colorband image data after the first array of pixels is configured to encode the positive representation of the first colorband image data and before the third array of pixels is configured to encode the positive representation of the third colorband image data. In the example shown, the second array of pixels is configured to encode the positive representation during half the time while the intensity of the light is at the high level 110 and during half the time the intensity of the light is at the low level 112. Thus, the illumination portion for the second spatial light modulator occurs midway through the display period and is both proceeded and followed by half the balance portion.

Since the light source 10 is generating light during both the illumination portion and balance portion of the display period for each of the first, second, and third spatial light modulator, the first, second, and third shutters 130 are used to prevent the reverse representation of the first, second, and third colorband image data from reaching the light output 105. Otherwise, the reverse representations would interfere with proper display of the positive representations at the light output.

Specifically, the first shutter is switched to an OPEN state 131 as the first spatial light modulator is configured to encode a positive representation of the first colorband image data (its illumination portion) in the first colorband of light. The first shutter is then switched to a CLOSED state 132 as the first spatial light modulator is configured to encode a reverse representation of the first colorband image data (its balance portion). Similarly, the second shutter (which begins the display period in the CLOSED state) is switched to an OPEN state 133 as the second spatial light modulator is configured to encode a positive representation of the second colorband image data (its illumination portion) in the second colorband of light. The second shutter is then switched to a CLOSED state 134 as the second spatial light modulator is configured to encode a reverse representation of the second colorband image data (its balance portion). Likewise, the third shutter is switched to an OPEN state 135 as the third spatial light modulator is configured to encode a positive representation of the third colorband image data (its illumination portion) in the third colorband of light. The third shutter is then switched to an CLOSED state 136 as the third spatial light modulator is configured to encode a reverse representation of the third colorband image data (its balance portion).

By coordinating the time of the configuration of each of the first, second, and third array of pixels, with the switching of the first, second, and third shutters, and the modulation of the light source color balance is achieved. In the example depicted in FIG. 19, the positive representation of the first colorband image data is encoded in the first colorband of light while the intensity of the light generated by the light source 10 is at the high level 110. The positive representation of the third colorband image data is encoded in the relatively more intense third colorband of light while the intensity of the light generated by the light source is at the low level 112. The positive representation of the second colorband image data is encoded in the second colorband of light partially while the intensity of the light generated by the light source is at the high level 110 and partially while at the low level 112.

Color balance is achieved in this example since a product of the average intensity of the light generated by the light source over the illumination portion of each of the first, second, and third spatial light modulators and the relative intensity of the first, second, and third spatial light modulator, respectively, are all equal. Specifically, for the first spatial light modulator, the average intensity of the light generated by the light source during its illumination portion is 150% and the relative intensity of the first colorband of light is 1. Thus, the product is 150 (150×1=150). For the second spatial light modulator, the average intensity of the light generated by the light source during its illumination portion is 100% (half at 50% and half at 150%) and the relative intensity of the second colorband of light is 1.5. Thus, the product is 150 (100×1.5=150). For the third spatial light modulator, the average intensity of the light generated by the light source during its illumination portion is 50% and the relative intensity of the third colorband of light is 3.

Thus, the product is 150 (50×3=150). Therefore the intensity of the all three colorbands of light are equal and color balance is achieved In practice, the high level 110 and the low level 112, along with the timing of the configurations can be set based on the relative intensity of each of the first, second, and third colorbands of light at a given intensity of the light generated by the light source 10. The high level and low level must be set a levels, however, so that the average lamp power dissipation level over the display period is maintained at a level that does not exceed the nominal lamp power dissipation level.

After each display period in the three spatial light modulator light valves, new first, second, and third colorband image data may be provided and the method of illuminating the light valve according to the invention may be repeated for the next display period.

Although this disclosure describes illustrative embodiments of the invention in detail, it is to be understood that the invention is not limited to the precise embodiments described, and that various modifications may be practiced within the scope of the invention defined by the appended claims.

I claim:

1. A method of illuminating a spatial light modulator using a light source, the spatial light modulator having an array of pixels; the method comprising:

generating different colorbands from the light source; and during each colorband period increasing intensity of light to a high level during an illumination period, and decreasing the intensity of the light to a low level during a dc balancing period;

average lamp power dissipation level over total duration of colorband periods of the spatial light modulator not exceeding a nominal lamp power dissipation level;

the high and low levels selected so that power dissipations of the colorbands are balanced;

at least one colorband having a high level above the nominal lamp power dissipation level and a low level below the nominal lamp power dissipation level.

2. The method according to claim 1, in which the spatial light modulator is a ferroelectric liquid-crystal based spatial light modulator;

the method further comprising supplying image data to the spatial light modulator as a positive representation during the illumination portions of the colorband periods and as reverse representations during the balance portions of the colorband periods.

3. The method according to claim 2, in which the intensity is decreased by turning off the light source.

4. The method according to claim 1, additionally including using a brightness user interface to select a desired brightness level during the illumination portions of the colorband periods.

5. A method of illuminating a light valve using a light source, the light valve including a light input, a light output, a spatial light modulator having an array of pixels, and a color sequencer for sequentially selecting one of a first, a second, and a third colorband of light, the method comprising:

illuminating the spatial light modulator through the light input with light generated by the light source;

setting the color sequencer to the first colorband of light during a first colorband period;

modulating the intensity of the light generated by the light source to a first high level during an illumination portion of the first colorband period and a first low level during a balance portion of the first colorband period;

setting the color sequencer to the second colorband of light during a second colorband period;

modulating the intensity of the light generated by the light source to a second high level during an illumination portion of the second colorband period and a second low level during a balance portion of the second colorband period;

setting the color sequencer to the third colorband of light during a third colorband period; and modulating the intensity of the light generated by the light source to a third high level during an illumination portion of the third colorband period and a third low level during a balance portion of the third colorband period;

an average lamp power dissipation level that does not exceed nominal lamp power dissipation level being maintained over a total of the first, the second, and the third colorband periods, the light intensity being modulated to maintain a balance in power dissipations of the colorbands.

6. The method according to claim 5, wherein each of the first, the second, and the third colorband periods is divided into an illumination portion and a balance portion of approximately equal duration; and wherein the light source is turned off during the balance portions.

7. The method according to claim 5, wherein the intensity of the light generated by the light source is increased to a first high level during the first colorband period; the intensity of the light generated by the light source is increased to a second high level during the second colorband period; and the intensity of the light generated by the light source is increased to a third high level during the third colorband period.

8. The method of illuminating a light valve according to claim 7, additionally including:

measuring the intensity of each of the first, the second, and the third colorband of light; and in which setting the first, the second, and the third level includes using the measured intensity of each of the first, the second, and the third colorband of light to determine the setting of the first, the second, and the third level.

9. The method of illuminating a light valve according to claim 7, additionally including:

providing a color balance user interface allowing selection of a desired color balance; and in which setting the first, the second, and the third level includes using the desired color balance to determine the setting of the first, the second, and the third level.

10. A method of illuminating a light valve using a light source having a nominal lamp power dissipation level, the light valve including a light input, a light output, a first, a second, and a third spatial light modulator, each with a first, a second, and a third array of pixels, and a color separator for directing a first, a second, and a third colorband of light from light received at the light input to the first, the second, and the third spatial light modulator, respectively; the method comprising:

illuminating the color separator through the light input with light generated by the light source;

providing a first, a second, and a third colorband image data;

configuring the first, the second, and the third arrays of pixels to encode a first, a second, and a third representation of the first, the second, and the third colorband image data in the first, the second, and the third colorband of light, respectively, during an illumination period;

modulating the intensity of the light generated by the light source to a level above the nominal lamp power dissipation level during an illumination period and a level below the nominal lamp power dissipation level during a balance period; and maintaining an average lamp power dissipation level that does not exceed the nominal lamp power dissipation level over the display period, while maintaining a balance of power dissipations of the colorbands.

11. The method according to claim 10, wherein the balance of power dissipations is maintained by adjusting the light intensity modulation.

12. The method according to claim 11, wherein adjusting the modulation includes adjusting the timing of the modulation.

13. The method according to claim 11, wherein adjusting the modulation includes adjusting the intensity level of the light generated by the light source to maintain the balance of power dissipations.

* * * * *